US012754924B2

(12) United States Patent
Stegner et al.

(10) Patent No.: US 12,754,924 B2
(45) Date of Patent: Oct. 6, 2026

(54) COMPUTER SYSTEM AND METHOD FOR SEARCHING BIM DATA OBJECTS

(71) Applicant: Procore Technologies, Inc., Carpinteria, CA (US)

(72) Inventors: Maria E. Stegner, Goleta, CA (US); Seyyedhamed Kassaei, Austin, TX (US); Scott Bieser, Alameda, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 18/518,065

(22) Filed: Nov. 22, 2023

(65) Prior Publication Data

US 2025/0165486 A1 May 22, 2025

(51) Int. Cl.
*G06F 16/248* (2019.01)
*G06F 16/25* (2019.01)

(52) U.S. Cl.
CPC .......... *G06F 16/248* (2019.01); *G06F 16/252* (2019.01)

(58) Field of Classification Search
None
See application file for complete search history.

(56) References Cited

U.S. PATENT DOCUMENTS

| | | | | |
|---|---|---|---|---|
| 2015/0169791 A1* | 6/2015 | Lavrov | G06F 30/13 703/1 |
| 2016/0103593 A1* | 4/2016 | Wynne, IV | G06F 30/00 715/771 |
| 2021/0200174 A1* | 7/2021 | Sridharan | G06F 40/30 |
| 2021/0295266 A1* | 9/2021 | McKee | G06F 30/13 |
| 2023/0359790 A1* | 11/2023 | Lee | G06F 30/27 |

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

*Primary Examiner* — Dawaune A Conyers
(74) *Attorney, Agent, or Firm* — Lee Sullivan Shea & Smith LLP

(57) ABSTRACT

An example client device is configured to: (i) access a building information model (BIM) file for a construction project, (ii) obtain an initial list of BIM data objects included in the BIM file, (iii) present, to a user, a visualization of the initial list of BIM data objects, (iv) receive a search query for the list of BIM data objects, (v) after receiving the search query, present, to the user, a visualization of a filtered list of BIM data objects comprising a given subset of BIM data objects that are identified based on the search query, (vi) receive, from the user, a request for an action to be taken for at least one BIM data object that is selected from the filtered list of BIM objects, and (vii) based on the received request, cause the requested action to be taken for the at least one BIM data object.

20 Claims, 11 Drawing Sheets

COMPUTER SYSTEM AND METHOD FOR SEARCHING BIM DATA OBJECTS

BACKGROUND

Building Information Models (BIMs) are used construction projects to help professionals plan and track the progress of said construction projects. BIM files hold vast amounts of information, some of which may be organized into BIM data objects that each represents a respective element of a planned real-world structure that is the subject of a construction project. Various software tools utilize these BIM data objects to enable users to organize and track the progress of the various elements involved in the construction of the planned real-world structure. It is important for software tools to have robust features regarding these BIM data objects, so that construction professionals may utilize the BIM data objects to streamline the various processes that are involved in the construction of planned real-world structures.

Overview

In accordance with the above, in one aspect, disclosed herein is a method that involves a client device (i) accessing a building information model (BIM) file for a construction project, (ii) obtaining an initial list of BIM data objects included in the BIM file, (iii) presenting, to a user, a visualization of the initial list of BIM data objects, (iv) receiving a search query for the list of BIM data objects, (v) after receiving the search query, presenting, to the user, a visualization of a filtered list of BIM data objects comprising a given subset of BIM data objects that are identified based on the search query, (vi) receiving, from the user, a request for an action to be taken for at least one BIM data object that is selected from the filtered list of BIM objects, and (vii) based on the received request, causing the requested action to be taken for the at least one BIM data object.

In another aspect, disclosed herein is a client device that includes at least one processor, at least one non-transitory computer-readable medium, and program instructions stored on the at least one non-transitory computer-readable medium that are executable by the at least one processor to cause the client device to carry out the functions disclosed herein, including but not limited to the functions of the foregoing method.

In yet another aspect, disclosed herein is a non-transitory computer-readable medium comprising program instructions that are executable to cause a client device to carry out the functions disclosed herein, including but not limited to the functions of the foregoing method.

One of ordinary skill in the art will appreciate these as well as numerous other aspects in reading the following disclosure.

DETAILED DESCRIPTION

Figure 1:
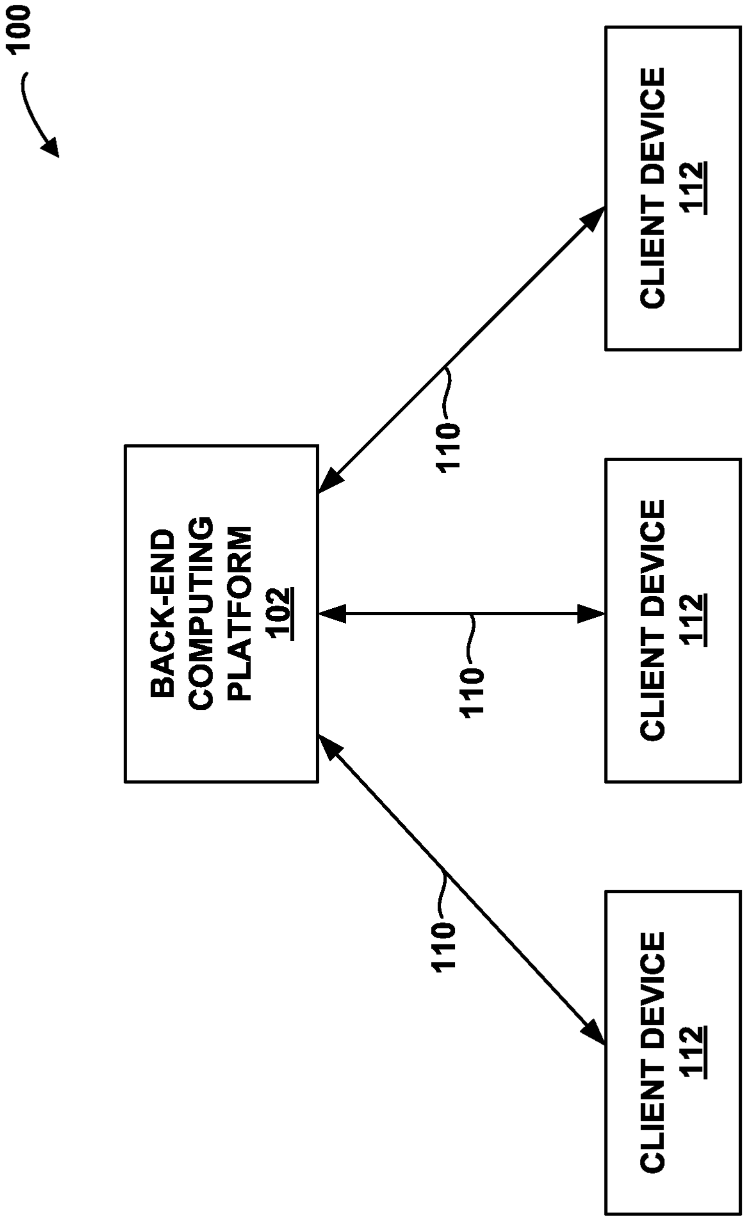
FIG. 1 is an illustration of an example network configuration in which the disclosed technology may be implemented.

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

The present disclosure relates to software technology for searching and interacting with a list of BIM data objects, referred to herein as a BIM searching tool. As used herein, a "BIM data object" refers to a digital representation of a given element of a real-world structure—such as a real-world structure that is the subject of a construction project that may be stored in a BIM file for the construction project. A BIM data object may include an object identifier ("object ID") (e.g., an alphanumeric string such as a universally unique identifier ("UUID")) and a given set of data that provides information about the real-world element that the BIM data object represents. For instance, one type of data that may be included in a BIM data object for a real-world element may be "geometry" data that provides information about the geometry of the real-world element (e.g., shape, dimensions, location, etc.). Another type of data that may be included in a BIM data object for a real-world element may be "properties" data that provides information about certain properties of the real-world element, examples of which may include the type of element, the category of element, the name of the element, the material of the element, the color of the element, a cost associated with the element, and technical details of the element, among other possible examples of element properties.

Yet another type of data that may be included in a BIM data object for a real-world element may be "relationship" data that provides information about the relationship (if any) between the real-world element and other real-world elements that are represented by BIM data objects within the BIM file. A BIM data object for a real-world element may include other types of data about the real-world element as well. Further, in at least some implementations, some or all of the described data for a given BIM data object may be located separately from the given BIM data instead of or in addition to being included in the given BIM data object.

As mentioned previously, it is important for software tools utilizing BIM data objects to have robust features regarding these BIM data objects, so that construction professionals may utilize these BIM data objects to streamline the various processes that are involved in the construction of planned real-world structures. Specifically, it is important for software tools utilizing BIM data objects to have some form of search capability. However, the software tools for BIM data objects that exist today have limited searching capabilities. As one example, although some software tools may allow a user to input a search query to identify BIM data objects that match the search query, these features are rudimentary, often utilizing flat lists or otherwise providing only limited user interactability with BIM data objects identified in a search. As another example, searching features of software tools utilizing BIM data objects today often show only limited results of a search, without any contextual information for those results. As yet another example, searching features of software tools utilizing BIM data objects today do not provide users with a convenient way to take one or more actions for certain BIM data objects identified in a search operation of the software tools.

To address these and other problems, disclosed herein is software technology for searching and interacting with a list of BIM data objects in a manner that enables users to take various actions based on the results of the search. At a high level, the disclosed software technology may take the form of a BIM data object search and selection tool, which may be referred to herein as a "BIM searching tool."

In practice, the BIM searching tool may be incorporated into a software application that may take any of various forms. For instance, as one possibility, the disclosed software technology may be incorporated into a client-server software application (sometimes referred to as a "web application" or a "Software as a Service (SaaS) application") comprising client-side software that runs on the client devices and interacts with server-side software installed on a back-end computing platform. As another possibility, the disclosed software technology may be incorporated into a native desktop or mobile application. This disclosed software technology may be incorporated into a software application that takes other forms as well.

In some implementations, the BIM searching tool disclosed herein may be incorporated into a software application that allows a user to view 3D and/or 2D models encoded within BIM files. In other implementations, the BIM searching tool disclosed herein may be incorporated into a software application that allows a user to generate estimates for construction projects. For instance, as mentioned previously, BIM data objects may include properties data indicating respective costs associated with the BIM data objects, which may be used by the software application to generate estimates for construction projects. In yet other implementations, the BIM searching tool disclosed herein may be incorporated into a dedicated BIM searching application that enables a user to search for BIM data objects within a BIM file and take action with respect to such BIM data objects with or without actually viewing 3D and/or 2D models encoded within BIM files. Other implementations are possible as well.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more the client devices, depicted here, for the sake of discussion, as the client devices 112.

Broadly speaking, the back-end computing platform 102 may comprise one or more computing systems (e.g., one or more servers) that have been provisioned with software for carrying out one or more of the server-side functions disclosed herein. In practice, the one or more computer systems of the back-end computing platform 102 may collectively comprise some set of physical computing resources (e.g., one or more processors, data storage system, communication interfaces, etc.), which may take any of various forms.

For instance, as one possibility, the back-end computing platform 102 may comprise cloud computing resources supplied by a third-party provider of "on demand" cloud computing resources, such as Amazon Web Services (AWS), Amazon Lambda, Google Cloud, Microsoft Azure, or the like. As another possibility, the back-end computing platform 102 may comprise "on-premises" computing resources of the organization that operates the back-end computing platform 102 (e.g., organization-owned servers). As yet another possibility, the back-end computing platform 102 may comprise a combination of cloud computing resources and on-premises computing resources. Other implementations of the back-end computing platform 102 are possible as well.

Further, in practice, the server-side software may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

In turn, the client devices 112 may each be any computing device that is capable of being installed with and running the client-side software disclosed herein, which as noted above may take the form of a client application that runs in a web browser, a native desktop application, or a mobile application, among other possibilities. In this respect, the client devices 112 may each include hardware components such as one or more processors, data storage, communication interfaces, and input/output (I/O) components (or interfaces for connecting thereto), among other possible hardware components, as well as software components such as operating system (OS) software, web browser software, and/or the client-side software disclosed herein, among other possible software components. As representative examples, the client devices 112 may each take the form of a desktop computer, a laptop, a netbook, a tablet, a smartphone, and/or a personal digital assistant (PDA), among other possibilities.

As further depicted in FIG. 1, each of the client devices 112 may be configured to communicate with the back-end computing platform 102 over a respective communication path 110. Each of these communication paths 110 may generally comprise one or more data networks and/or data links, which may take any of various forms. For instance, each respective communication path 110 with the back-end computing platform 102 may include any one or more of point-to-point links, Personal Area Networks (PANs), Local-Area Networks (LANs), Wide-Area Networks (WANs) such as the Internet or cellular networks, and/or cloud networks, where each such data link and/or data network may be wireless, wired, or some combination thereof, and may carry data according to any of various different communication protocols. Additionally, the communication between an example client device 112 and the back-end computing platform 102 may be carried out via an Application Programming Interface (API) provided by the back-end computing platform 102, among other possibilities. Although not shown, the respective communication paths 110 between the client devices 112 and the back-end computing platform 102 may also include one or more intermediate systems, examples of which may include a data aggregation system and host server, among other possibilities. Many other configurations are also possible.

Although not shown in FIG. 1, the back-end computing platform 102 may also be configured to receive data, such as data related to a construction project, from one or more external data sources, such as an external database and/or another back-end computing platform or platforms. Such data sources—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or fewer of the pictured components.

Figure 2:
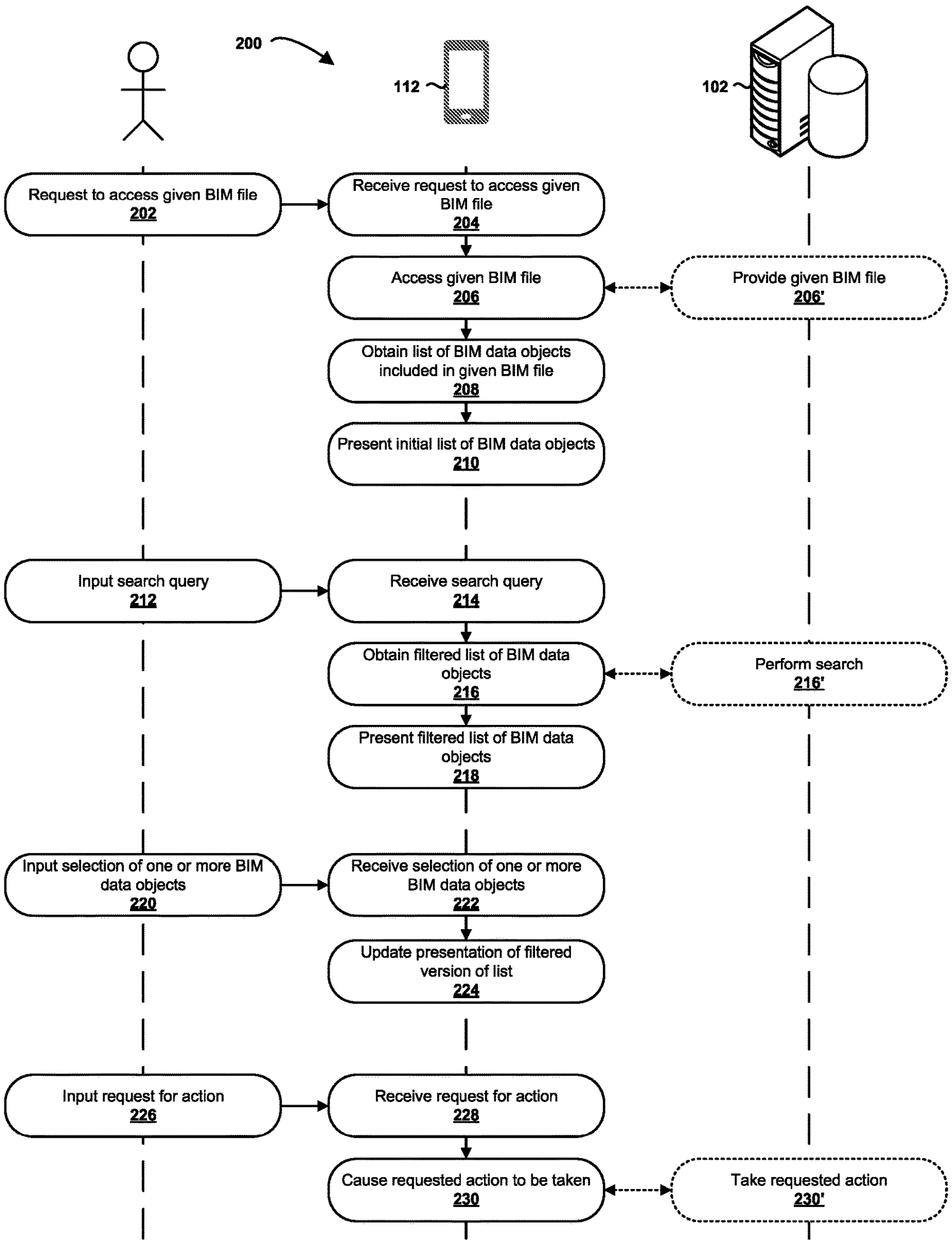
FIG. 2 is a flow diagram that illustrates one example of operations of an example process that may be carried out in accordance with the disclosed technology.

Turning now to FIG. 2, a flow diagram 200 is shown that illustrates example functionality that may be carried out in accordance with the disclosed technology. For purposes of illustration only, the example functionality of FIG. 2 is described as being carried out within the example network environment of FIG. 1, which as noted above may include a client device 112 and a back-end computing platform 102. It should be understood, however, that this example functionality may be carried out by any of various other devices in any of various other network environments as well. Further, it should be understood that the example functionality of FIG. 2 is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

In the example illustrated in FIG. 2, it will be assumed that the client device 112 has already launched a software application that incorporates the disclosed BIM search tool, such as a native or web application for viewing 3D models and/or 2D models encoded within BIM files, and a user of the client device 112 has already input any necessary user credentials (e.g., username and password) for the software application.

As shown in FIG. 2, the example functionality may begin at block 202 with the user of the client device 112 inputting a request to access a given BIM file for which to perform a BIM object search. In practice, the user may carry out this action by selecting the given BIM file (e.g., from a directory of available BIM files that can be accessed by the software application) and thereby requesting that the client device 112 access the given BIM file. However, the user's request to access the given BIM file may take other forms as well.

At block 204, the client device 112 may receive the user's request to access the given BIM file.

At block 206, the client device 112 may access the given BIM file. This function may take any of various forms. As one possibility, the client device 112 may access the given BIM file by retrieving the given BIM file from the client device's data storage, for example, in implementations where the given BIM file is stored locally on the client device 112.

As another possibility, the client device 112 may access the given BIM file from the back-end computing platform 102, for example, in implementations where the given BIM file is stored remotely at the back-end computing platform 102. For instance, as shown in FIG. 2, the client device 112 may optionally transmit a request to the back-end computing platform 102 for the given BIM file, and then at optional block 206', the back-end computing platform 102 may (i) receive the request from the client device 112 to access the given BIM file, (ii) retrieve the given BIM file from the back-end computing platform's data storage (or an external data store that is accessible to the back-end computing platform 102), and then (iii) transmit the given BIM file back to the client device 112 over the respective communication path between the back-end computing platform 102 and the client device 112. This may in turn result in the client device 112 receiving the given BIM file from the back-end computing platform 102. In this way, the client device 112 may access the given BIM file by virtue of requesting and receiving the given BIM file from the back-end computing platform 102.

The client device 112 may access the given BIM file in various other ways as well.

In line with the discussion above, the given BIM file that is accessed by the client device 112 may comprise a set of BIM data objects, which, as previously described, are digital representations of the elements of a real-world structure. Each of these BIM data objects may include an object ID, as well as a given set of data that provides information about the real-world element that the BIM data object represents, including geometry data, properties data, and relationship data, as previously described. A BIM data object for a real-world element may include other types of data about the real-world element as well.

Further, in line with the discussion above, the given BIM file that is accessed by the client device 112 may be associated with a corresponding supplemental dataset that is maintained separately from the given BIM file and provides information about the properties and/or relationships of the real-world elements represented by the BIM data objects within the given BIM file. For instance, as one possible implementation, the given BIM file may have a corresponding supplemental dataset comprising a set of data records that are keyed to the object IDs of the BIM data objects within the given BIM file, where each data record for a BIM data object includes properties data (e.g., type, category, name, cost, etc.) for the real-world element represented by the BIM data object and/or relationship data for the real-world element represented by the BIM data object. In this respect, the properties and/or relationship data contained within the supplemental dataset may serve to supplement and expand the properties and/or relationship data that is contained within the given BIM data file, which may contain a more limited subset of properties and/or relationship data for the real-world elements represented by the BIM data objects (e.g., only the properties and/or relationship data required to render a visual representation of the BIM data objects), although there could also be some overlap between the properties and/or relationship data contained within the given BIM file and its corresponding supplemental dataset.

In this respect, as part of accessing the given BIM file at block 206, the client device 112 may also access the given BIM file's corresponding supplemental dataset. For instance, in some implementations, the given BIM file's corresponding supplemental dataset may be stored locally in the client device's data storage, in which case the client device 112 may retrieve and load the supplemental dataset from its data storage as part of the function of accessing the given BIM file.

In other implementations, the given BIM file's corresponding supplemental dataset may be stored remotely at the back-end computing platform 102 (which may be the case regardless of whether the given BIM file is stored locally at the client device 112 or remotely at the back-end computing platform 102), in which case the client device 112 may access the supplemental dataset from the back-end computing platform 102. In such cases, the client device 112 may transmit a request to the back-end computing platform 102 for the supplemental dataset, and then the back-end computing platform 102 may (i) receive the request from the client device 112 to access the supplemental dataset, (ii) retrieve the supplemental dataset from the back-end computing platform's data storage (or an external data store that is accessible to the back-end computing platform 102), and then (iii) transmit the supplemental dataset back to the client device 112 over the respective communication path between the back-end computing platform 102 and the client device 112. This may in turn result in the client device 112 receiving the supplemental dataset from the back-end computing platform 102. In this way, the client device 112 may access the supplemental dataset by virtue of requesting and receiving the supplemental dataset from the back-end computing platform 102.

However, in implementations where the given BIM file has a corresponding supplemental dataset, the client device 112 could alternatively access the supplemental dataset at a different time than it accesses the given BIM file. For instance, as one possible implementation, the client device 112 could function to access the given BIM file's supplemental dataset at a later time, such as when that supplemental dataset may be necessary for performing one of the functions disclosed herein (e.g., as part of obtaining an initial list of BIM data objects within the given BIM file). In implementations where the given BIM file has a corresponding supplemental dataset, the client device 112 may access that supplemental dataset at other times and/or in other manners as well.

Further, in some implementations, the client device 112 may access only a portion of the supplemental dataset, rather than the entire supplemental dataset. In such implementations, various of the operations described above, as performed by either by the client device 112 or the back-end computing platform 102, may be performed for only a portion of the supplemental dataset.

At block 208, the client device 112 may obtain an initial list of BIM data objects that are included in the given BIM file. In practice, the client device 112 may obtain the initial list of BIM data objects in various ways.

As one possibility, the client device 112 may generate the initial list of BIM data objects locally based on information extracted from the given BIM file as well as possibly based on information extracted from a corresponding supplemental dataset (which may be accessed by the client device 112 either at the time it accesses the given BIM file or at some other time). For instance, the client device 112 may parse through some or all of the given BIM file, and possibly some or all of the corresponding supplemental dataset, to extract information from which to generate the initial list of BIM data objects. The information extracted by the client device 112 may include (i) the object IDs for the BIM data objects of the given BIM file, (ii) the relationship information for the BIM data objects of the given BIM file, and possibly also (iii) the values for certain properties of the BIM data objects of the given BIM file, such as the element types, categories, and/or names (which as noted above could be contained within the BIM data objects themselves and/or could be contained within the corresponding supplemental dataset), among various other possibilities. Using the extracted information from the given BIM file and possibly also the supplemental dataset corresponding to the given BIM file, the client device 112 may then generate the initial list of BIM data objects. As described in greater detail below, this initial list of BIM data objects may take various forms.

As another possibility, the client device 112 may obtain the initial list of BIM data objects from the back-end computing platform 102. For instance, the client device 112 may optionally transmit a request to the back-end computing platform 102 for an initial list of BIM data objects within the given BIM file, and the back-end computing platform 102 may then (i) receive the request from the client device 112 to obtain an initial list of BIM data objects within the given BIM file, (ii) either retrieve the initial list of BIM data objects within the given BIM file from the back-end computing platform's data storage (if the initial list has already previously been generated and stored) or generate the initial list of BIM data objects within the given BIM file based on information extracted from the given BIM file and/or its corresponding supplemental dataset, and (iii) transmit the initial list of BIM data objects within the given BIM file back to the client device 112 over the respective communication path between the back-end computing platform 102 and the client device 112, which may in turn result in the client device 112 receiving the initial list of BIM data objects within the given BIM file from the back-end computing platform 102.

The client device 112 may obtain the initial list of BIM data objects within the given BIM file in various other ways as well.

Further, the initial list of BIM data objects obtained by the client device 112 may include a respective line item for each of at least a subset of the BIM data objects within the given BIM file, and the line items may represent the BIM data objects in various ways. As one example, a line item for a given BIM data object may comprise an object ID of the given BIM data object. As another example, a line item for a given BIM data object may comprise a name of the given BIM data object. As yet another example, a line item for a given BIM data object may comprise information regarding the relationship between the given BIM data object and one or more other BIM data objects, which may identify (i) the one or more other BIM data objects (e.g., by including object IDs (and/or names) of the one or more other BIM data objects) and (ii) the type of relationship between the given BIM data object and the one or more other BIM data objects (e.g., parent, child, sibling, among others, each of which are described in greater detail below). As described in further detail below, the client device 112 may use this information to arrange the BIM data objects in a hierarchical manner. The line items of the initial list of BIM data objects may represent the BIM data objects using other types of information as well. Further, the examples provided are not intended to be mutually exclusive, and line items of the initial list of BIM data objects may comprise multiple types of information for representing the BIM data objects.

Further yet, the initial list of BIM data objects obtained by the client device 112 may be structured in any of various ways. As one possibility, the initial list of BIM data objects may be structured as a hierarchical list that is generated based on relationship information extracted from the given BIM file and possibly the corresponding supplemental dataset. As used herein, a hierarchical list may refer to a list of BIM data objects that are organized into various hierarchical levels. For instance, a hierarchical list may include a certain number of tiered levels, such as a first level, a second level, and a third level (among various other possible levels), and each BIM data object in the hierarchical list may be located in one of the hierarchical levels.

Relationship information of the BIM data objects may define connections between the BIM data objects in the hierarchical list. As one example, a BIM data object located in the first (e.g., top) level of the hierarchical list may have a parent relationship with a BIM data object located in the second level. As another example, the BIM data object located on the second level of the hierarchical list may have a child relationship with the BIM data object located in the first level. Further, if the BIM data object located in the first level of the hierarchical list has parent relationships with multiple BIM data objects located in the second level, then those BIM data objects may have sibling relationships with each other. As may be appreciated, there may be various other kinds of hierarchical relationships between the BIM data objects of the hierarchical list, which may generally be grouped into "ancestor" relationships (e.g., parent, grandparent, etc.) and "descendent" relationships (e.g., child, grandchild, etc.), among various other possible groupings.

As another possibility, the initial list of BIM data objects may be structured as a flat list of BIM data objects, in which case the line items of the initial list of BIM data objects can be sorted based on any one or more properties included within the line items. Various other possibilities may also exist.

Further yet, the initial list of BIM data objects obtained by the client device 112 may include line items for a particular set of BIM data objects, which could take various forms. As one possibility, the initial list of BIM data objects obtained by the client device 112 may include line items for all of the BIM data objects included within the given BIM file. As another possibility, the initial list of BIM data objects obtained by the client device 112 may include line items for a subset of the BIM data objects within the BIM file. For example, if the disclosed BIM search tool is configured to exclude certain types or categories of BIM data objects (e.g., mesh-level objects) from the initial list of BIM data objects that is to be presented to a user, then those types or categories of BIM data objects may be excluded from the initial list of BIM data objects that is obtained by the client device 112. The set of BIM data objects represented by line items in the initial list of BIM data objects may take any of various other forms as well.

Still further, the client device 112 may obtain the initial list of BIM data objects at various times, and possibly in response to various triggers. As one possibility, the client device 112 may obtain the initial list of BIM data objects in response to the user's request to access the given BIM file, as described with respect to block 202. Consequently, the client device 112 may perform the functionality of the blocks 206 and 208 at or around the same time, as both may be triggered by the user's request to access the BIM file. As another possibility, the client device 112 may obtain the initial list of BIM data objects in response to a later user request, for example, a user request to view a list of BIM data objects within the given BIM file. In practice, the client device 112 may obtain the initial list of BIM data objects at various other times as well, and possibly in response to various other triggers as well.

At block 210, the client device 112 may present a visualization of the initial list of BIM data objects. Such a visualization of the initial list of BIM data objects may take various forms.

For instance, as an initial matter, the visualization of the initial list of BIM data objects may either show all of the listed BIM data objects from the initial list of BIM data objects or may show a selected subset of the listed BIM data objects from the initial list of BIM data objects. For instance, if there are any BIM data objects that the BIM search tool is configured to exclude from the visualization, those BIM data objects may not be included in the selected subset of the listed BIM data objects.

Further, the manner in which the listed BIM data objects are represented within the visualization may take various forms. As one possibility, the visualization may represent a listed BIM data object as a line item comprising (i) an alphanumeric label for the listed BIM data object, such as the name of the listed BIM data object and/or some other alphanumeric descriptor of the listed BIM data object, (ii) a first selectable element that enables the user to select the listed BIM data object via a mouse click, a touch input, or the like, one example of which may be a checkbox, (iii) in a scenario where the initial list of BIM data objects is hierarchical in nature, a second selectable element that enables the user to toggle between showing and hiding (i.e., expanding or collapsing) listed BIM data objects that are nested underneath the listed BIM data object via a mouse click, a touch input, or the like, one example of which may be a selectable arrow icon, and (iv) a third selectable element (a view/hide selectable icon) that enables the user to show or hide a visual representation of the listed BIM data object from a visualization of a 3D model (and possibly a 2D model) of the given BIM file, which may be presented via the software application that incorporates the disclosed BIM search tool, among other possible GUI elements that may be included in a line item for a listed BIM data object. However, the visualization may represent a listed BIM data object in other manners as well, including but not limited to the possibility that the alphanumeric label or other portion of a listed BIM data object could itself be selectable via a mouse click, a touch input, or the like.

Further yet, the functionality that is carried out by the client device 112 in order to present the visualization of the initial list of BIM data objects may take various forms. For instance, in at least some implementations, the functionality for presenting the visualization of the initial list of BIM data objects may begin with the client device 112 selecting a set of listed BIM data objects that are to be included in the visualization. The set of listed BIM data objects selected by the client device 112 may take various forms. As one possibility, the set of listed BIM data objects selected by the client device 112 may comprise each BIM data object of the initial list of BIM data objects. As another possibility, the set of listed BIM data objects selected by the client device 112 may comprise BIM data objects of one or more hierarchical levels, in scenarios where the initial list of BIM data objects is hierarchical in nature. For instance, the client device 112 may select a top level, and possibly one or more additional levels, of listed BIM data objects to be presented in the visualization of the initial list of BIM data objects. In practice, the user may define settings to define which levels of listed BIM data objects are to be included in the visualization of the initial list of BIM data objects.

As yet another possibility, the set of listed BIM data objects may comprise listed BIM data objects selected by the client device 112 based on one or more user interactions with the software application that integrates the BIM search tool. To illustrate with an example, in an implementation where the software application presents a 3D visualization of a model encoded within the given BIM file, the user may isolate a view of a certain portion of the 3D visualization. In this example, when the client device 112 begins presenting the visualization of the initial list of BIM data objects, the client device 112 may start by selecting a set of listed BIM data objects that correspond to the certain portion of the 3D visualization isolated by the user. The client device 112 may select listed BIM data objects based on various other user interactions with the software application that integrates the BIM search tool as well.

The set of listed BIM data objects selected by the client device 112 may take any of various other forms as well.

After selecting the set of listed BIM data objects that are to be included in the visualization, the client device 112 may determine how the listed BIM data objects in the selected set are to be arranged within the visualization. As one possibility, the client device 112 may determine to arrange the listed BIM data objects in the selected set within the visualization based on the structure of the initial list of BIM data objects. For instance, if the initial list of BIM data objects is structured in a hierarchical manner, then the client device 112 may arrange the listed BIM data objects in the selected set within the visualization in the hierarchical manner, such that child BIM data objects are nested underneath respective parent BIM data objects.

Alternatively, if the initial list of BIM data objects is structured as a flat list, then the client device 112 may arrange the listed BIM data objects in the selected set within the visualization accordingly, such that the listed BIM data objects are sorted in the visualization similar to how the line items are sorted in the initial list of BIM data objects. As another possibility, the client device 112 may determine how the listed BIM data objects are to be arranged within the visualization based on user-defined settings. For instance, the user may define settings to configure the client device 112 to arrange the listed BIM data objects within the visualization in a hierarchical manner, regardless of the structure of the initial list of BIM data objects. Various other possibilities may also exist.

Additionally, after selecting the set of listed BIM data objects that are to be included in the visualization, the client device 112 may determine the alphanumeric labels (e.g., names) for the listed BIM data objects in the selected set. In implementations where the initial list of BIM data objects obtained by the client device 112 includes the names of the BIM data objects in the selected set, the client device 112 may determine the alphanumeric labels for the listed BIM data objects in the selected list by accessing the names of the BIM data objects in the selected set that are included in the initial list of BIM data objects.

However, in some implementations, the initial list of BIM data objects does not include the names of the BIM data objects in the selected set. Instead, the initial list of BIM data objects may include object IDs of the BIM data objects. In such implementations, the client device 112 may be configured to determine the alphanumeric labels for the listed BIM data objects in the selected set by accessing a supplemental dataset that includes the names of the BIM data objects in the selected set keyed to the object IDs of the BIM data objects in the selected set and then retrieving those names using the object IDs of the BIM data objects in the selected set. As one possibility, where the supplemental database is stored locally on the client device 112, the client device 112 may perform the action of retrieving the names of the BIM data objects in the selected set from the supplemental dataset using the object IDs of the BIM data objects in the selected set. As another possibility, where the supplemental dataset is stored remotely at the back-end computing platform 102, the client device 112 may access the names of the BIM data objects in the selected set from the back-end computing platform 102. To accomplish this, the client device 112 may transmit a request to the back-end computing platform 102 for the names of the BIM data objects in the selected set. The request may include an indication of the object IDs of the BIM objects in the selected set. Then, the back-end computing platform 102 may (i) receive the request from the client device 112, (ii) retrieve the names of the BIM objects in the selected set from the supplemental dataset from the back-end computing platform's data storage (or an external data store that is accessible to the back-end computing platform 102) using the indicated object IDs, and then (iii) transmit the names of the BIM objects in the selected set back to the client device 112 over the respective communication path between the back-end computing platform 102 and the client device 112. This may in turn result in the client device 112 receiving the names of the BIM objects in the selected set from the back-end computing platform 102. The client device 112 may determine the alphanumeric labels in various other ways as well.

Lastly, after determining the arrangement and alphanumeric labels for the listed BIM data objects in the selected set, the client device 112 may use that information to generate and render the visualization of the initial list of BIM data objects.

The functionality that is carried out by the client device 112 in order to present the visualization of the initial list of BIM data objects may take other forms as well.

Still further, the client device 112 may present the visualization of the initial list of BIM data objects at various times and possibly in response to various triggers. As one possibility, the client device 112 may be configured to begin presenting the visualization of the initial list of BIM data objects in response to receiving the user's request to access the given BIM file. As another possibility, the client device 112 may be configured to begin presenting the visualization of the initial list of BIM data objects in response to receiving a separate user request to view a listing of BIM data objects within the given BIM file. The client device 112 could present the visualization of the initial list of BIM data objects at other times and/or in response to other triggers as well.

The functionality for presenting the visualization of the initial list of BIM data objects may take other forms as well.

Along with presenting the visualization of the initial list of BIM data objects, the client device 112 operating in accordance with the present disclosure may also present a search bar that enables a user to input search queries for the initial list of BIM data objects, which will be described in greater detail below.

In scenarios where the disclosed BIM search tool is incorporated into a software application that enables a user to engage in other actions with respect to BIM files, such as viewing of 3D and/or 2D models encoded within BIM files, then the visualization of the initial list of BIM data objects may be presented together with other visualizations as well. For instance, as one possibility, the client device 112 may present the visualization of the initial list of BIM data objects as an overlay that sits on top of a visualization of a 3D model and/or 2D model encoded within the given BIM file. The visualization of the initial list of BIM data objects may be presented together with other types of visualizations as well.

After the client device 112 presents the visualization of the initial list of BIM data objects, the user may also interact with the visualization in ways that cause the client device 112 to update the visualization. For instance, in a scenario where the initial list of BIM data objects is hierarchical in nature, the user may select an element for a given listed BIM data object that enables toggling between showing and hiding (i.e., expanding or collapsing) listed BIM data objects that are nested underneath the given listed BIM data object, which may in turn cause the client device 112 to update the visualization by either showing or hiding certain listed BIM data objects that are nested underneath the given listed BIM data object. As one example, when the user inputs a request to show listed BIM data objects that are nested underneath the given listed BIM data object, the function of updating the visualization could involve either showing only the next-lowest level of listed BIM data objects that are nested underneath the given listed BIM data object (i.e., the given listed BIM data object's children) or showing multiple levels of listed BIM data objects that are nested underneath the given listed BIM data object (e.g., the given listed BIM data object's children, grandchildren, great grandchildren, etc.), among other possibilities. As another example, when the user inputs a request to collapse the given listed BIM data object, the function of updating the visualization could involve hiding descendent BIM data objects that are nested underneath the given listed BIM data objects (e.g., the given listed BIM data object's children, grandchildren, great-grandchildren, etc.).

The user may interact with the visualization and/or the client device 112 may update the visualization in other ways as well.

Figure 3A:
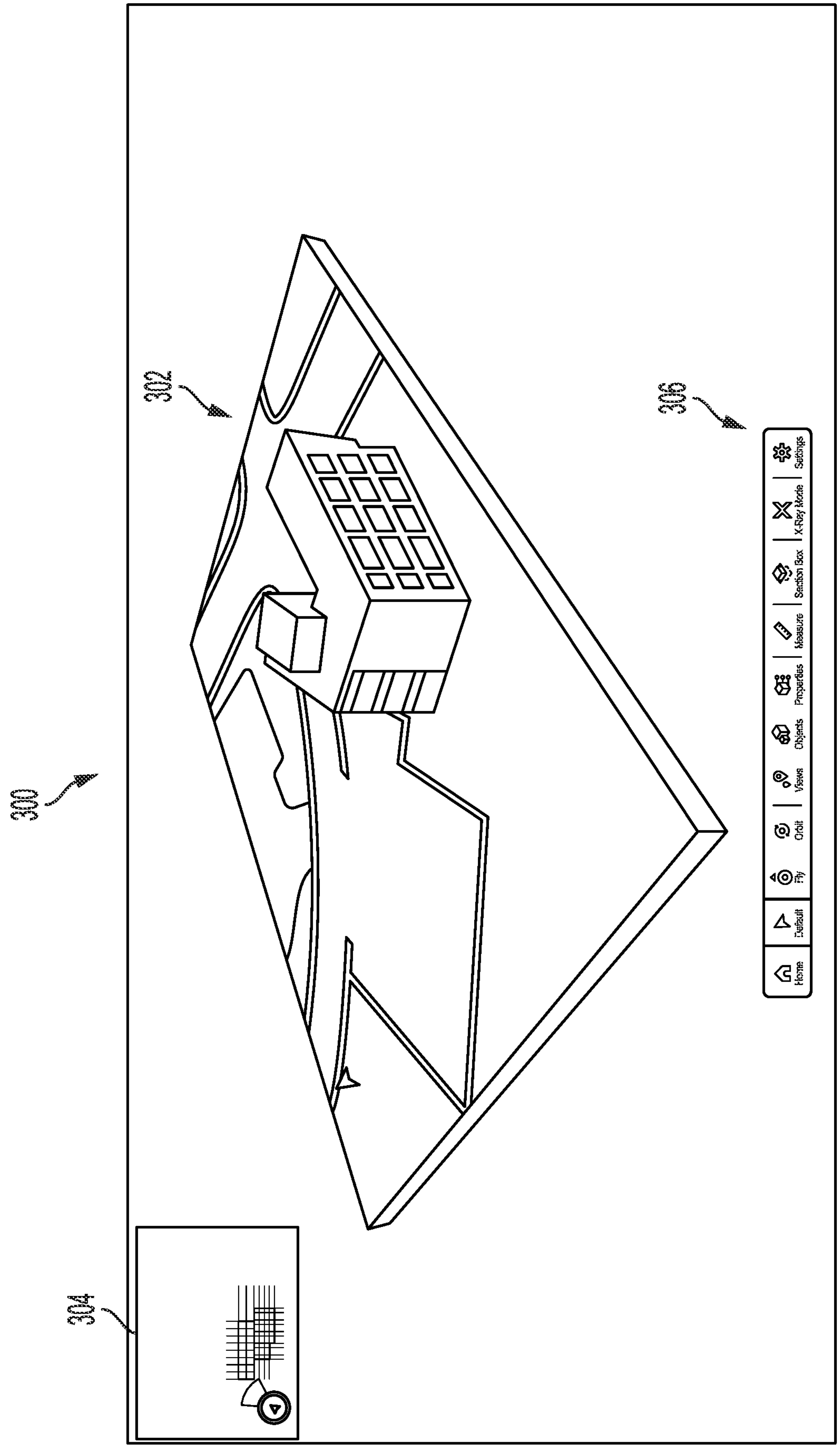
FIG. 3A illustrates an example GUI view that may be presented by a client device while running an example software application that incorporates a BIM search tool, according to the present disclosure.
Figure 3B:
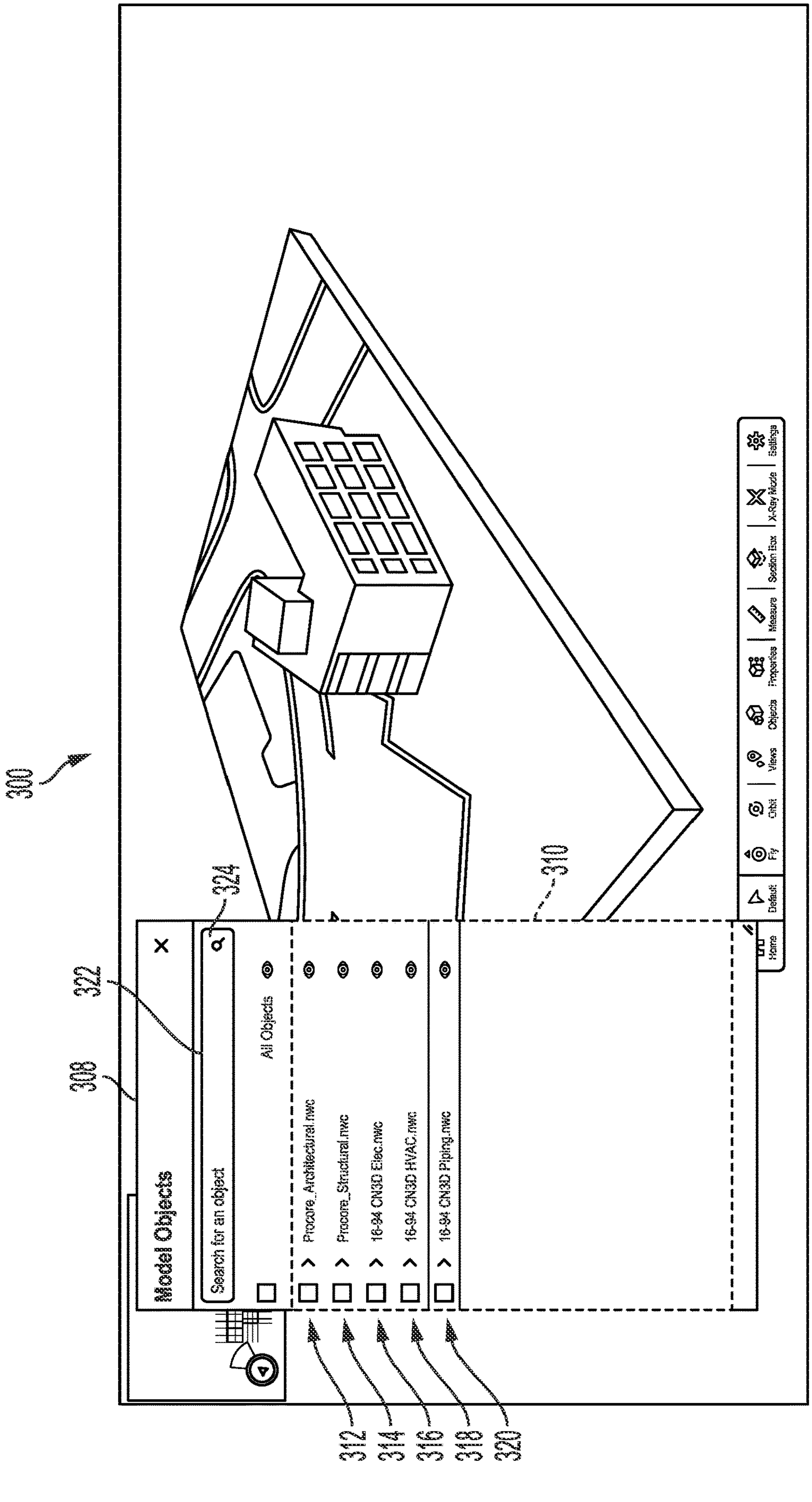
FIG. 3B illustrates an updated version of the example GUI view of FIG. 3A, including a visualization of an initial list of BIM data objects, according to the present disclosure.

FIGS. 3A and 3B are included to provide illustrative examples of views that a client device running a software application incorporating the disclosed BIM search tool may present to a user after receiving a request to access a given BIM file.

FIG. 3A illustrates an example GUI view 300 that may be presented by the client device 112 while running an example software application that incorporates the disclosed BIM search tool. In practice, the client device 112 may be configured to present the example GUI view 300 in response to receiving a user request to access a given BIM file, as previously described with respect to block 204.

As shown, the example GUI view 300 may include a visualization 302 of a 3D model encoded within the given BIM file. The 3D visualization 302 may include various components (e.g., physical elements) to describe the construction project in detail, so as to enable construction professionals to utilize the 3D visualization 302 in planning and executing operations associated with the construction project.

As shown, the example GUI view 300 may also optionally include a visualization 304 of a 2D model encoded within the given BIM file. As shown, the 2D visualization 304 illustrates a top-down view of the 3D model of the construction project and may take the form of a 2D technical drawing (e.g., an architectural floor plan) for the construction project. In practice, any 2D view of the 3D model of the construction project may be shown via the 2D visualization 304, and the 2D visualization 304 may further enable construction professionals to plan and execute operations associated with the construction project.

Further, as shown, the example GUI view 300 may include a toolbar 306. The toolbar 306 may include various buttons that enable a user to engage in various functionality of the example software application running on the client device 112. Such buttons may include (i) a "Home" button that enables returning to a "home" view of the example software application, (ii) a "Default" button that enables returning to a "default" view of the 3D visualization 302, (iii) a "Fly" button that enables "flying" around the 3D visualization 302 (e.g., by adjusting a viewpoint of the 3D visualization 302), (iv) an "Orbit" button that enables "orbiting" around the 3D visualization 302 (e.g., by rotating the view of the 3D visualization 302), (v) a "Views" button that enables selecting or saving various views of the 3D visualization 302, (vi) an "Objects" button that enables accessing and interacting with a list of BIM data objects within the given BIM file, (vii) a "Properties" button that enables selecting various properties of the construction project to show/hide in the 3D visualization 302, (viii) a "Measure" button that enables measuring various aspects of the 3D visualization 302, (ix) a "Section Box" button that enables presenting and interacting with a section box to isolate custom views of the 3D visualization 302, (x) an "X-Ray Mode" button that enables viewing the 3D visualization 302 in an "x-ray" mode (e.g., by making some surfaces/structures of the 3D visualization 302 appear semi-transparent), and (xi) a "Settings" button that enables accessing and interacting with a settings menu of the 3D visualization 302, among various other possibilities.

In accordance with the present disclosure, a user's selection of the "Objects" button may cause the client device 112 to present a visualization of an initial list of BIM data objects within the given BIM file, as described above with reference to block 210. However, it should be understood that the client device 112 may be triggered to present a visualization of an initial list of BIM data objects within the given BIM file in other manners as well.

FIG. 3B illustrates an updated version of the example GUI view 300, which now includes an overlay 308 on top of the visualizations 302 and 304 that includes a visualization 310 of an initial list of BIM data objects included within the given BIM file.

In the example of FIG. 3B, the visualization 310 is currently showing five line items for respective listed BIM data objects from the initial list of BIM data objects including (i) a first line item 312 for a first listed BIM data object that is named "Procore_Architectural.nwc," (ii) a second line item 314 for a second listed BIM data object that is named "Procore_Structural.nwc," (iii) a third line item 316 for a third listed BIM data object that is named "16-94 CN3D Elec.nwc," (iv) a fourth line item 318 for a fourth listed BIM data object that is named "16-94 CN3D HVAC.nwc," and (v) a fifth line item 320 for a fifth listed BIM data object that is named "16-94 CN3D Piping.nwc." In line the with discussion above, each of the line items 312-320 may include (i) an alphanumeric label for the line item's respective listed BIM data object (e.g., the name of the respective listed BIM data object), (ii) a selectable checkbox that enables the user to select the line item's respective listed BIM data object, (iii) a selectable arrow icon that enables the user to toggle between showing and hiding line items of listed BIM data objects that are nested underneath the line item of the respective listed BIM data object, and (iv) a selectable icon that enables the user to show or hide a visual representation of the line item's respective listed BIM data object in the 3D visualization 302 (and possibly the 2D visualization 304).

In line with the discussion above, the listed BIM data objects represented by the line items 312-320 may make up the top hierarchical level of the initial list of BIM data objects.

Further, as previously described, the client device 112 may function to update the visualization 310 based on certain user interactions. As shown, and in line with the discussion above, each of the line items 312-320 includes a selectable arrow icon that enables the user to cause the client device 112 to update the visualization 310. For example, in response to detecting a selection of the selectable arrow icon of the line item 312, the client device 112 will update the visualization 310 to show or hide (depending on whether the line item 312 was in a collapsed or expanded state at the time that the selectable arrow icon was selected) one or more line items for respective BIM data objects that are nested underneath the line item 312. In practice, the one or more line items that are shown may be (i) located in the layer immediately below the layer where the line item 312 is located (i.e., partially expanded), or possibly (ii) every line item that is nested underneath the line item 312 (i.e., fully expanded).

As shown in FIG. 3B, the overlay 308 also includes a search bar 322 and a search selectable icon 324 that a user may utilize to input search queries, as described in greater detail below.

Returning to FIG. 2, at block 212, the user of the client device 112 may input a search query to identify one or more listed BIM data objects from the initial list of BIM data objects.

In accordance with the present disclosure, the user's search query may comprise one or more search terms, each of which comprises a string of alphanumeric text. The search terms may be used to search for BIM data objects. In one implementation, the disclosed BIM search tool may be configured to accept and run the user's search query against one specified, predefined BIM data object property by default, such as BIM data object name, in which case the user's search query may comprise one or more search terms for searching against the names of the listed BIM data objects. However, in other implementations, the disclosed BIM search tool may be configured to accept and run search queries against multiple different BIM data object properties, in which case the user's search query may comprise one or more search terms for searching against multiple different properties of the listed BIM data objects. And in such implementations, it is possible that the user's search query could include additional criteria that specifies which BIM data object properties are to be searched using the one or more search terms (e.g., the search query could specify that a first search term is to be searched against BIM data object name, a second search term is to be searched against BIM data object category, etc.). The user's search query could take other forms as well—including but not limited to the possibility that a search query could additionally include a logical operator (e.g., AND, OR, etc.) between search terms.

In practice, the user may input the search query into a search bar that is presented by the client device 112, such as by typing (or pasting) one or more search terms along with any other optional criteria for performing the search. In some implementations, after the user finishes interacting with the search bar, the user may then optionally input a request to initiate the search based on the search query, such as by hitting an "enter" (or "return") key on a keyboard or clicking/tapping on a selectable element (e.g., a search icon) for initiating a search. However, in other implementations, the disclosed BIM search tool may be configured to initiate the search automatically once the user begins typing into the search bar (and may iteratively initiate an updated search as the user continues to type within the search bar)—in which case the user may not provide a separate input that initiates the search based on the user's search query.

At block 214, the client device 112 may receive the search query input by the user at block 212.

At block 216, after the user inputs the search query, the client device 112 may initiate a search of the initial list of BIM data objects based on the search query and thereby obtain a filtered list of BIM data objects comprising a given subset of one or more BIM data objects that are identified based on the search query, which may be referred to herein as "matching" BIM data objects. In line with the discussion above, the client device 112 may function to initiate the search in response to receiving an affirmative request from the user to initiate the search (e.g., the user hitting an "enter" key on a keyboard after typing within the search bar or clicking/tapping on a selectable element for initiating a search), or the client device 112 may function to initiate the search automatically based on detecting that the user has typed something into the search bar—in which case the client device 112 may iterative initiate multiple intermediate searches while the user is typing and may then initiate a final search once the user has finished inputting the full search query. For purposes of the discussion below, the searching functionality will be described with reference to a search that has been initiated after the user has finished inputting the full search query.

At a high level, the functionality involved in obtaining the filtered list of BIM data objects may include (i) searching the BIM data objects within the given BIM file based on the search query and thereby identifying the subset of one or more matching BIM data objects, (ii) obtaining certain information about the one or more matching BIM data objects for use in generating the filtered list of BIM data objects (e.g., object IDs and relationship information), and (iii) based on the obtained information, generating the filtered list of BIM data objects. And depending on the implementation, each of these functions could be performed by the client device 112, the back-end computing platform, or some combination thereof. Some example implementations will now be described in further detail below.

In one implementation, the client device 112 may perform the mentioned functions for obtaining the filtered list of BIM data objects locally. In this implementation, the client device 112 may begin by performing a search for BIM data objects within the given BIM file based on the search query and thereby identifying the subset of one or more matching BIM data objects.

The client device 112 may perform the search against various sources of data, such as (i) a supplemental dataset corresponding to the given BIM file, (ii) the initial list of BIM data objects, and/or (iii) the given BIM file, for instance, in implementations where these sources of data are stored locally on the client device 112. The client device 112 may perform the search against any one of these sources of data, or may possibly perform the search against several of these sources of data. In practice, this may depend on whether a given source of data includes information that the search query can be run against to identify matching BIM data objects. For instance, if the search query includes a search term identifying a given BIM data object name, then the client device 112 may run the search against a source of data that includes name property information for the BIM data objects within the given BIM file. The client device 112 may perform the search against various other sources of data, and based on various other considerations as well.

To perform the search, the client device 112 may compare one or more search terms included in the search query with information in one or more sources of data (i.e., one or more of the corresponding supplemental dataset, the initial list of BIM data objects, or the given BIM file) to identify the subset of one or more matching BIM data objects. As mentioned, the type of information that the one or more search terms are compared with may take any of various forms, and may be based on various considerations. For instance, the information may take the form of one or more BIM data object properties, which may be predefined or specified by additional criteria included in the search query, among other possibilities.

To illustrate with an example, the client device 112 may receive a search query including a search term "Condenser." In this example, the BIM data object property "name" may be predefined as the type of information that search terms are compared with, such that when the client device 112 receives the search query, the client device 112 may compare the search term "Condenser" with "name" property information from one or more data sources to identify the subset of one or more matching BIM data objects. Various other examples may also exist.

In practice, the client device 112 may determine that a BIM data object matches a search term in various ways. As one possibility, the client device 112 may determine that a BIM data object matches a search term if information in the one or more data sources corresponding to the BIM data object (e.g., a name of the BIM data object) includes the search term. Continuing the example above, the client device 112 may determine that a given BIM data object named "Condenser_fitting" matches the search term, as the search term "Condenser" is included in the name "Condenser_fitting." As another possibility, the client device 112 may determine that a BIM data object matches a search term if information in the one or more data sources corresponding to the BIM data object is identical to the search term. Continuing the example above, the client device 112 may determine that a given BIM data object named "Condenser_fitting" does not match the search term, as it is not identical to the search term "Condenser." In practice, the determination of whether or not the value is identical to the search term may or may not be a case-sensitive determination. Various other possibilities may also exist.

The client device 112 may then proceed to obtain certain information about the subset of one or more matching BIM data objects for use in generating the filtered list of BIM data objects. As mentioned, the certain information may include object IDs, and possibly relationship information, of the one or more matching BIM data objects. The client device 112 may obtain the object IDs and relationship information from various sources, such as the data sources previously described (i.e., one or more of the corresponding supplemental dataset, the initial list of BIM data objects, or the given BIM file). As one possibility, the client device 112 may obtain the object IDs and relationship information from a data source that the client device 112 performed the search against. Continuing the previous example, after comparing the search term "Condenser" with "name" property information from the one or more data sources and identifying the subset of one or more matching BIM data objects, the client device 112 may then identify and retrieve, from the one or more data sources, object IDs and/or relationship information for the one or more matching BIM data objects. As another possibility, the client device 112 may obtain the object IDs and relationship information about the subset of one or more matching BIM data objects from a different data source than from where the client device 112 performed the search.

After identifying the subset of one or more matching BIM data objects and obtaining the object IDs and possibly relationship information of the subset of one or more matching BIM data objects (among various other possible types of information), the client device 112 may then generate the filtered list of BIM data objects. In practice, the filtered list of BIM data objects may be similar to the initial list of BIM data objects previously described in various aspects (e.g., may be structured in a hierarchical manner or as a flat list, may include line items taking any of the forms previously described, etc.), with the exception that the filtered list of BIM data objects may only include line items for the matching BIM data objects.

In another implementation, the client device 112 may perform some of the functions for obtaining the filtered list of BIM data objects locally, while the back-end computing platform 102 may perform others of those functions. FIG. 2 shows that the back-end computing platform 102 may optionally perform operations of block 216', such as performing a search against one or more data sources. However, in practice, the back-end computing platform 102 may perform other operations than just performing the search.

For instance, as shown in FIG. 2, the client device 112 may optionally transmit a request to the back-end computing platform 102 to perform the search remotely, which may include an indication of the search query (e.g., including the one or more search terms and any other criteria included in the search query), and then the back-end computing platform 102 may, at block 216', (i) receive the request from the client device 112, (ii) perform the search against one or more sources of data from the back-end computing platform's data storage (or one or more external data stores that are accessible to the back-end computing platform 102) to identify the subset of one or more matching BIM data objects, (iii) obtain certain information about the subset of one or more matching BIM data objects, such as object IDs and/or relationship information for the subset of one or more matching BIM data objects, and then (iv) transmit the obtained information about the subset of one or more matching BIM data objects back to the client device 112 over the respective communication path between the back-end computing platform 102 and the client device 112. The client device 112 may then receive the information about the subset of one or more matching BIM data objects from the back-end computing platform 102 and then, based on the received information, generate the filtered list of BIM data objects.

In some instances, the client device 112 may supplement the information received from the back-end computing platform 102 by retrieving additional information related to the subset of one or more matching BIM data objects, such as from data sources that are stored locally at the client device 112. For example, if the information received from the back-end computing platform 102 is not sufficient to enable the client device 112 to generate the filtered list of BIM data objects, the client device 112 may retrieve additional information to use with the information received from the back-end computing platform 102 to generate the filtered list of BIM data objects.

In yet another implementation, the back-end computing platform 102 may perform the functions for generating the filtered list of BIM data objects, and may then transmit the generated filtered list of BIM data objects to the client device 112. For instance, the client device 112 may transmit a request to the back-end computing platform 102 to perform the functions remotely, which may include an indication of the search query (e.g., including the one or more search terms and any other criteria included in the search query), and then the back-end computing platform 102 may (i) receive the request from the client device 112, (ii) perform the search against one or more sources of data from the back-end computing platform's data storage (or one or more external data stores that are accessible to the back-end computing platform 102) to identify the subset of one or more matching BIM data objects, (iii) obtain certain information about the subset of one or more matching BIM data objects, such as object IDs and/or relationship information for the subset of one or more matching BIM data objects, (iv) generate the filtered list of BIM data objects based on the obtained information, and then (v) transmit the generated filtered list of BIM data objects back to the client device 112 over the respective communication path between the back-end computing platform 102 and the client device 112.

There may be various other implementations for how the client device 112 may obtain the filtered list of BIM data objects.

In some implementations, after obtaining the filtered list of BIM data objects, the client device 112, or possibly the back-end computing platform 102, may identify one or more additional BIM data objects to add to the filtered list of BIM data objects that are not matching BIM data objects. For instance, the filtered list of BIM data objects may be updated to include "non-matching" BIM data objects that have a certain relationship with a matching BIM data object.

One such relationship may take the form of a descendent hierarchical relationship. For instance, a non-matching BIM data object may be included in the filtered list of BIM data objects if the non-matching BIM data object is a descendent of another matching BIM data object. As previously described, there may be various types of descendent hierarchical relationships, such as a child hierarchical relationship, a grandchild hierarchical relationship, and so on. In practice, any of these may be included as a type of relationship that may cause a non-matching BIM data object to be included in the filtered list of BIM data objects.

Another such relationship may take the form of an ancestor hierarchical relationship. For instance, a non-matching BIM data object may be included in the filtered list of BIM data objects if the non-matching BIM data object is an ancestor of another matching BIM data object. As previously described, there may be various types of ancestor hierarchical relationships, such as a parent hierarchical relationship, a grandparent hierarchical relationship, and so on. In practice, any of these may be included as a type of relationship that may cause a non-matching BIM data object to be included in the filtered list of BIM data objects.

In practice, there may be various other types of relationships that may cause a non-matching BIM data object to be included in the filtered list of BIM data objects. However, in at least some implementations, non-matching BIM data objects with one type of relationship with a matching BIM data object may be included in the filtered list of BIM data objects, whereas non-matching BIM data objects with another type of relationship with a matching BIM data object may not be included in the filtered list of BIM data objects. For instance, non-matching BIM data objects that are ancestors of matching BIM data objects may be included in the filtered list of BIM data objects, whereas non-matching BIM data objects that are descendants of matching BIM data objects may not be included. Alternatively, non-matching BIM data objects that are descendents of matching BIM data objects may be included in the filtered list of BIM data objects, whereas non-matching BIM data objects that are ancestors of matching BIM data objects may not be included. Various other examples may also exist.

In implementations where the filtered list of BIM data objects includes one or more non-matching BIM data objects, the filtered list of BIM data objects may also include indications of which BIM data objects are matching BIM data objects, and possibly which BIM data objects are non-matching. The client device 112 may use these indications in various ways to inform the user of which BIM data objects presented within the filtered list of BIM data objects match the search term included in the user's search query, as described in greater detail below.

Further, the client device 112 may obtain the filtered list of BIM data objects at various times, and possibly in response to various triggers. As one possibility, the client device 112 may obtain the filtered list of BIM data objects in response to receiving an affirmative request from the user to initiate a search, as described with respect to block 214. As another possibility, the client device 112 may obtain the filtered list of BIM data objects based on detecting that the user has typed something into the search bar—in which case the client device 112 may iteratively update the filtered list of BIM data objects while the user is typing and may then perform a final update on the filtered list of BIM data objects once the user has finished inputting the full search query. In practice, the client device 112 may obtain the filtered list of BIM data objects at various other times as well, and possibly in response to various other triggers as well.

At block 218, the client device 112 may present a visualization of the filtered list of BIM data objects. In practice, the operations of block 218 may be similar to the operations of block 210 in at least some aspects, and thus are not described in as great detail.

As with the visualization of the initial list of BIM data objects previously described, the visualization of the filtered list of BIM data objects may either show all of the listed BIM data objects from the filtered list of BIM data objects or may show a selected subset of the listed BIM data objects from the filtered list of BIM data objects.

Further, the visualization of the filtered list of BIM data objects may represent listed BIM data objects of the filtered list as line items similar to those previously described with respect to the visualization of the initial list of BIM data objects.

Further yet, similar to the manner described with respect to block 210, functionality that is carried out by the client device 112 in order to present the visualization of the filtered list of BIM data objects may include (i) selecting a set of listed BIM data objects of the filtered list of BIM data objects that are to be included in the visualization (which may include matching listed BIM data objects as well as possibly non-matching listed BIM data objects that have a certain relationship with a matching listed BIM data object, as previously described), (ii) determining how the listed BIM data objects in the selected set are to be arranged within the visualization of the filtered list of BIM data objects (e.g., as a flat list or in a hierarchical manner, etc.) based on various factors, (iii) determining alphanumeric labels for the listed BIM data objects in the selected set, and then (iv) generate and render the visualization of the filtered list of BIM data objects.

The client device 112 may present the visualization of the filtered list of BIM data objects in various other ways as well.

Figure 3C:
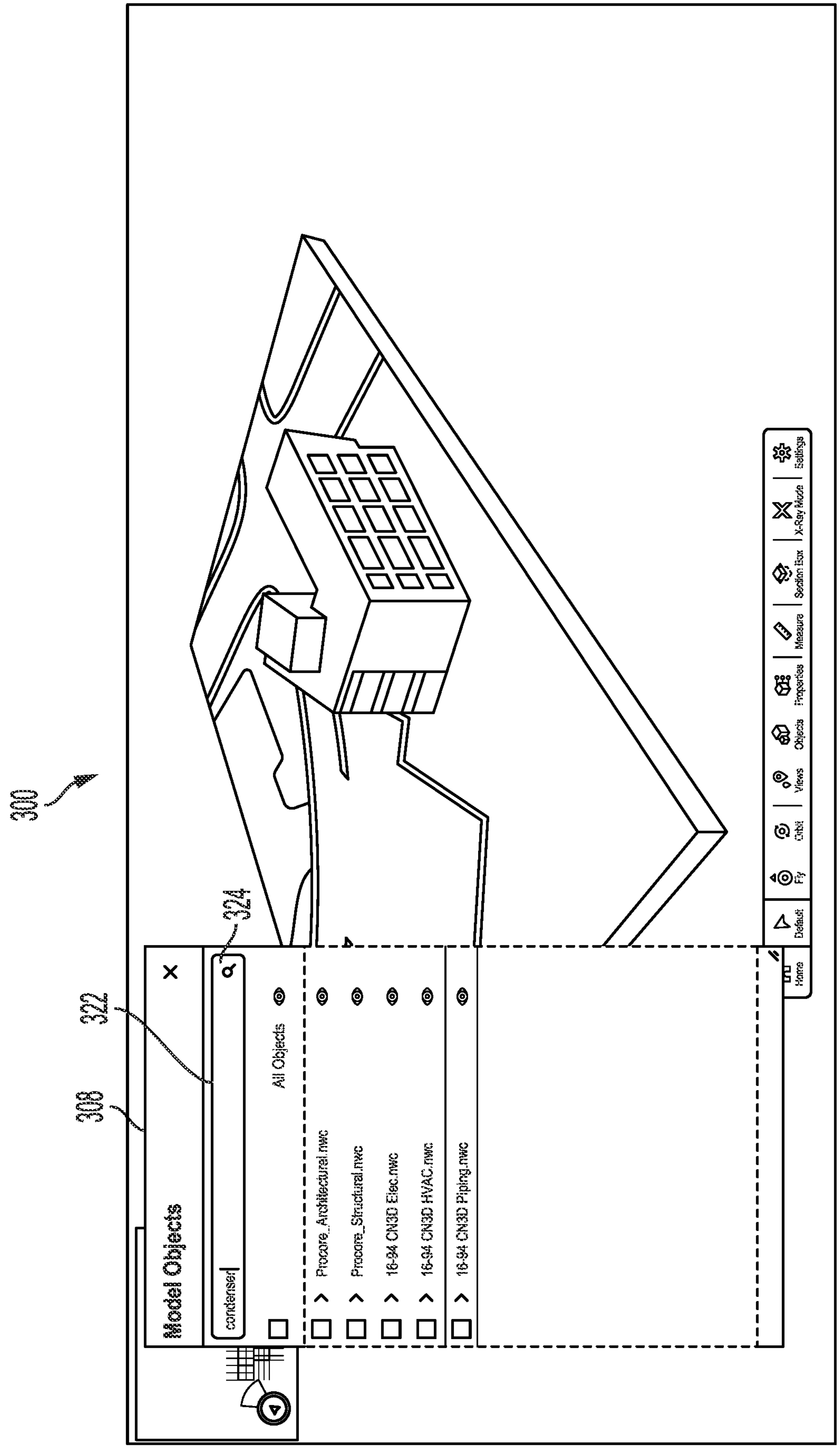
FIG. 3C illustrates another updated version of the example GUI view, including a search bar populated with a search term, according to the present disclosure.

FIG. 3C illustrates an example manner in which the client device 112 may receive the search query, as in block 214. As shown, the search bar 322 of the overlay 308 has been populated with the search term "condenser," which the user may have typed into the search bar 322.

In line with the previous discussion, after the client device 112 receives the search query, as described at block 214 and shown in FIG. 3C, the client device 112 may then obtain and present a filtered list of BIM data objects, as previously described with respect to blocks 216 and 218.

Figure 3D:
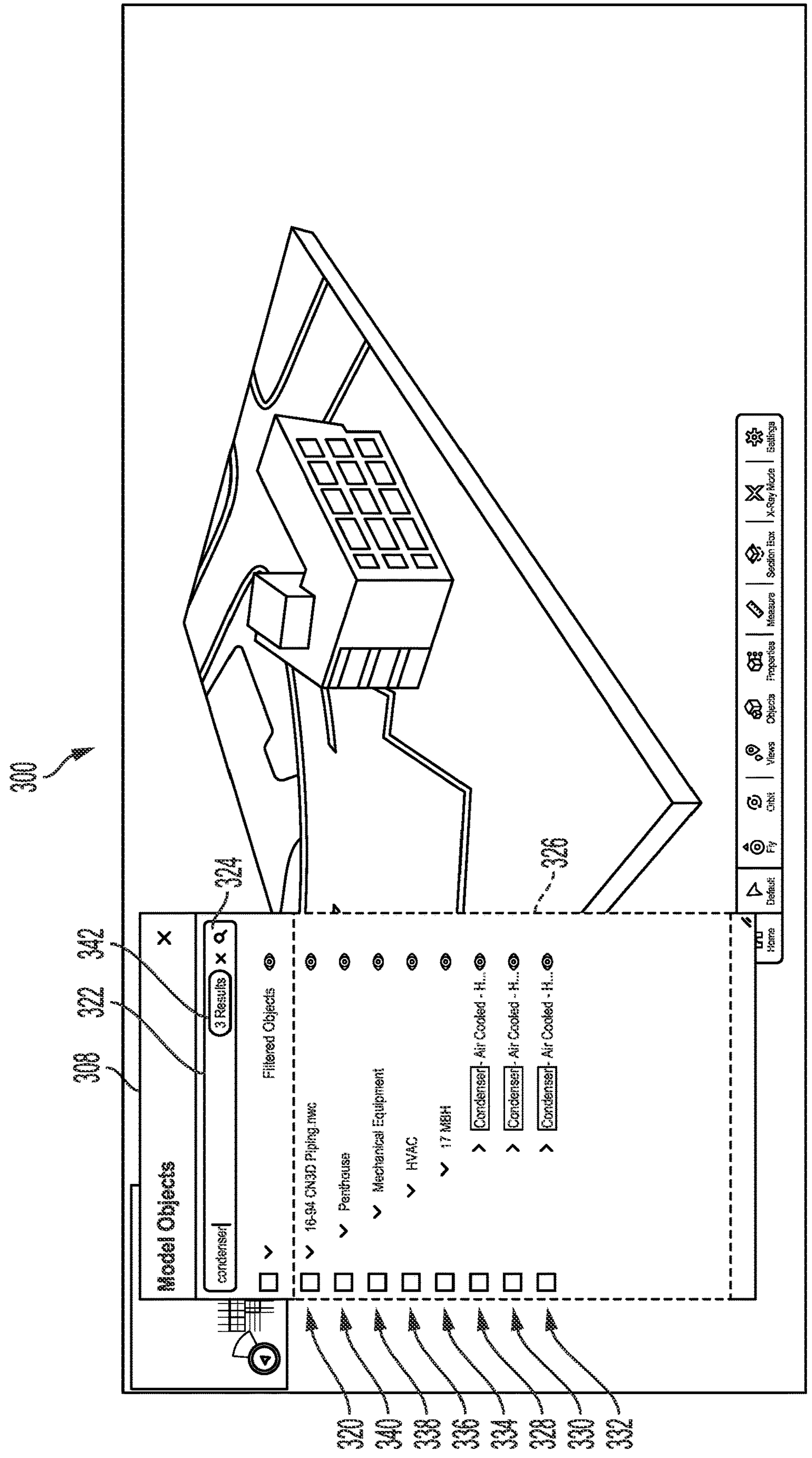
FIG. 3D illustrates another updated version of the example GUI view, including a visualization of a filtered list of BIM data objects, according to the present disclosure.

FIG. 3D shows one manner in which the client device may present a filtered list of BIM data objects obtained by the client device 112. As shown, FIG. 3D illustrates an updated version of the example GUI view 300 wherein the visualization 310 has been replaced with a visualization 326 of a filtered list of BIM data objects that includes line items for (i) matching listed BIM data objects (e.g., listed BIM data objects that include the search term "condenser" in their names) and (ii) non-matching listed BIM data objects (e.g., listed BIM data objects that do not include the search term "condenser" in their name) that have an ancestor hierarchical relationship with a matching listed BIM data object. As shown, these line items are presented in a hierarchical manner.

The visualization 326 includes line items 328, 330, and 332, each representing a respective matching listed BIM data object named "Condenser—Air Cooled—Horizontal—17-265 MBH." Although only a portion of the names are shown in the line items 328-332, it may be possible for the client device 112 to show the full name for a given listed BIM data object, for instance in response to certain user interaction with the line item of the given listed BIM data object (e.g., by hovering a mouse over the name of the given listed BIM data object in the line item, or possibly by expanding one or more dimensions of the overlay 308 in order to display the full name of the given listen BIM data object in the line item).

As shown, the line items 328-332 are nested beneath non-matching listed BIM data objects of various levels of the hierarchical structure of the filtered list of BIM data objects. Specifically, the line items 328-332 are shown located on a sixth level of the hierarchical structure, and are nested beneath a line item 334 for a non-matching listed BIM data object named "17 MBH" located on a fifth level of the hierarchical structure, which is nested beneath a line item 336 for a non-matching listed BIM data object named "HVAC" located on a fourth level of the hierarchical structure, which is nested beneath a line item 338 for a non-matching listed BIM data object named "Mechanical Equipment" located on a third hierarchical level of the hierarchical structure, which is nested beneath a line item 340 for a non-matching listed BIM data object named "Penthouse" located on a second hierarchical level of the hierarchical structure, which is nested beneath the line item 320 for the non-matching listed BIM data object named "16-94 CN3D Piping.nwc" located on a first hierarchical level of the hierarchical structure, which was previously shown in a collapsed state in FIGS. 3B-3C.

In line with the discussion above, the non-matching listed BIM data objects represented by the line items 320 and 334-340 may be included in the filtered list of BIM data objects and represented in the visualization 326 due to having a respective ancestor hierarchical relationships with the matching listed BIM data objects represented by the line items 328-334. Although the line items for non-matching listed BIM data objects included in the visualization 326 represent only non-matching listed BIM data objects with an ancestor hierarchical relationship with a matching listed BIM data object, in at least some implementations the visualization 326 may include line items for non-matching listed BIM data objects with various other types of relationships with matching BIM data objects, as previously described. Alternatively, the visualization 326 may include only line items for matching listed BIM data objects, and may not include any line items for non-matching listed BIM data objects.

Further, the client device 112 may utilize highlights or other indicators to show the user which of the listed BIM data objects represented in the visualization 326 are matching listed BIM data objects. As shown in FIG. 3D, the portions of the alphanumeric labels of the line items 328-332 that include the search term "condenser" are highlighted to indicate to the user that the listed BIM data objects represented by the line items 328-332 are matching listed BIM data objects. However, in some implementations, the client device 112 may highlight other portions (including all) of the alphanumeric labels of the line items 328-332, or may indicate to the user that the listed BIM data objects represented by the line items 328-332 are matching listed BIM data objects in various other ways.

The client device 112 may also utilize a results icon to indicate how many matching listed BIM data objects are represented by line items in the visualization 326. As shown, the overlay 308 has been updated to include a results icon 342 indicating that there are three matching listed BIM data objects represented by line items in the visualization 326 (e.g., the listed BIM data objects represented by the line items 328-332).

Returning to FIG. 2, at block 220, the user may input a selection of one or more listed BIM data objects from the filtered list of BIM data objects via the visualization that is presented at block 218. This selection of the one or more listed BIM data objects at block 220 may serve as a precursor to the user requesting that at least one action be taken with respect to the one or more listed BIM data objects that are selected, as described in greater detail below. However, this functionality for selecting a listed BIM data object in advance of inputting a request that an action be taken for the listed BIM data object is merely one possible way that the user may initiate an action for a listed BIM object, and in other implementations, the user may input a request to take an action for a listed BIM object that does not require pre-selection of the listed BIM object.

The user's selection of the one or more listed BIM data objects from the filtered list of BIM data objects may take various forms. As one possibility, the user may input the selection of the one or more listed BIM data objects by interacting with a respective line item for each of the one or more listed BIM data objects being selected. For instance, in line with the discussion above, the line items presented in the visualization of the filtered list of BIM data objects may each include a respective checkbox, and the user may click or touch the respective checkbox of the line item of each of the one or more listed BIM data objects being selected by the user.

As another possibility, in a scenario where the filtered list of BIM data objects is hierarchical in nature, a user's selection of one listed BIM data object from the filtered list of BIM data objects (via a selectable element such as a checkbox) may also serve as a selection of other listed BIM data objects from the filtered list of BIM data objects. For instance, when a given listed BIM data object has other listed BIM data objects that are nested underneath the given listed BIM data object (e.g., located at one or more levels under the level of the given listed BIM data object), the user may collectively select the nested BIM data objects by virtue of selecting the given listed BIM data object. In this respect, if the filtered list of BIM data objects includes both the subset of BIM data objects that were found to match the search query and also other non-matching BIM data objects that are related to the matching BIM data objects and included for context, the selections that are made using the nesting of the filtered list may either include or exclude the non-matching BIM data objects.

As yet another possibility, the user may input the selection of the one or more listed BIM data objects by selecting a "select all" selectable icon that may be included in the visualization of the filtered list of BIM data objects. This may enable the user to quickly select all of the listed BIM data objects shown in the visualization. In this respect, if the filtered list of BIM data objects includes both the subset of BIM data objects that were found to match the search query and also other non-matching BIM data objects that are related to the matching BIM data objects and included for context, the selections that are made using the "select all" feature may either include or exclude the non-matching BIM data objects.

The user's selection of the one or more listed BIM data objects from the filtered list of BIM data objects may take other forms as well.

At block 222, the client device 122 may receive the selection of the one or more BIM data objects input by the user at block 220.

At block 224, the client device 112 may update the visualization of the filtered list of BIM data objects to reflect the user's selection. This functionality may take various forms.

For instance, if the user's selection involves a selection of a checkbox for a listed BIM data object, the client device 112 may update the visualization to show that the checkbox has a "checked" status. Similarly, user interactions comprising a deselection of a listed BIM data object may update the presentation of the checkbox to show an "unchecked" status.

Further, in response to such a user selection or deselection, the client device 112 may also update the presentation of one or more other checkboxes. As one possibility, a user selection or deselection of a checkbox of a given listed BIM data object having one or more other listed BIM data objects nested beneath the given listed BIM data object may cause the checkboxes of the one or more other listed BIM data objects nested beneath the given listed BIM data object to be updated as well as the checkbox of the given listed BIM data object. This may involve updating the checkboxes of the one or more other listed BIM data objects nested beneath the given listed BIM data object to show a "checked" status when the given listed BIM data object is selected, or alternatively this may involve updating the checkboxes of the one or more other listed BIM data objects nested beneath the given listed BIM data object to show an "unchecked" status when the given listed BIM data object is deselected. In some implementations, this functionality may depend on factors such as whether the given listed BIM data objects is a matching listed BIM data object and whether the one or more other listed BIM data objects nested beneath the given listed BIM data object are matching listed BIM data objects. However, in at least some implementations, the described functionality may apply whether or not the given listed BIM data objects or the one or more other listed BIM data objects are matching listed BIM data objects.

As another possibility, a user selection or deselection of a checkbox of a given listed BIM data object nested beneath one or more other listed BIM data objects may cause the checkboxes of the one or more other listed BIM data objects to be updated as well as the checkbox of the given listed BIM data object. In implementations where a checkbox of a given listed BIM data object is updated based on a user selection or deselection of a listed BIM data object nested beneath the given listed BIM data object, the checkbox of the given listed BIM data object may be updated in various ways. As one example, when some, but not all, of the matching listed BIM data objects nested beneath the given listed BIM data object are selected, then the checkbox of the given listed BIM data object may be updated to show a "partially checked" status, which may be presented as a horizontal line across the checkbox, or possibly as a numerical representation of what fraction of matching listed BIM data objects nested beneath the given listed BIM data object are selected. As another example, when all of the matching listed BIM data objects nested beneath the given listed BIM data object are selected, then the checkbox of the given listed BIM data object may be updated to show a "checked" status. As yet another example, when none of the matching listed BIM data objects nested beneath the given listed BIM data object are selected (e.g., in response to a user deselection of a matching listed BIM data object nested beneath the given listed BIM data object), then the checkbox of the given listed BIM data object may be updated to show an "unchecked" status.

In line with the previous discussion, this functionality may depend on factors such as whether a selected/deselected listed BIM data object that is nested beneath a given listed BIM data object is a matching listed BIM data object and whether the given listed BIM data object is a matching listed BIM data object. However, in at least some implementations, the described functionality may apply whether or not selected/deselected listed BIM data object that is nested beneath the given listed BIM data object or the given listed BIM data object are matching listed BIM data objects. Various other possibilities may also exist.

Additionally, a counter may be presented by the client device 112, indicating how many of the matching listed BIM data objects of the filtered list of BIM data objects have been selected by the user.

Further, once the user has selected at least one of the listed BIM data objects, the client device 112 may present an "Object Actions" selectable button that may facilitate the user selecting one or more actions to be taken for any selected listed BIM data objects.

The client device 112 may be configured to update the presentation in various other ways as well based on the user selection of one or more matching BIM data objects.

Figure 3E:
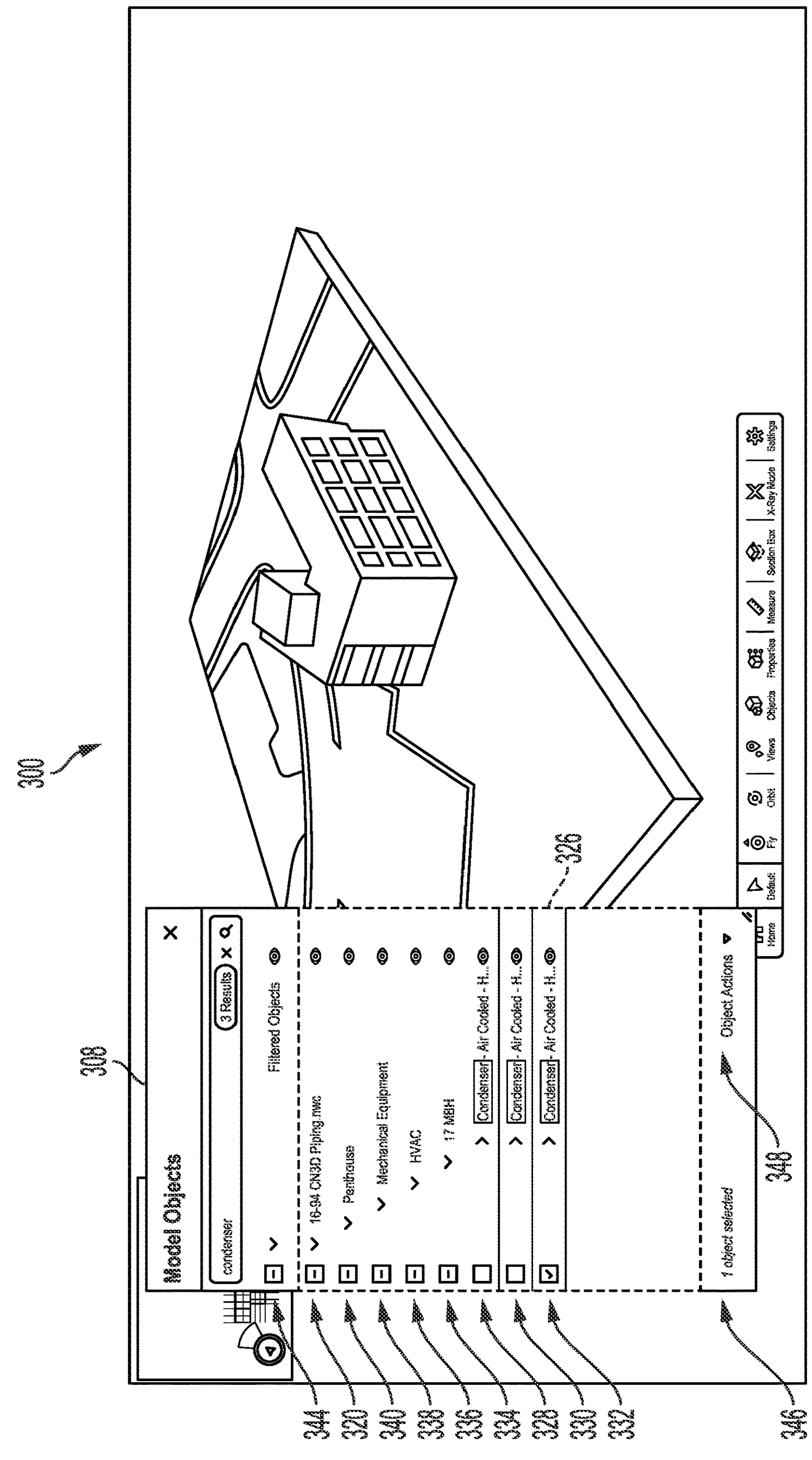
FIG. 3E illustrates another updated version of the example GUI view 4, according to the present disclosure.
Figure 3F:
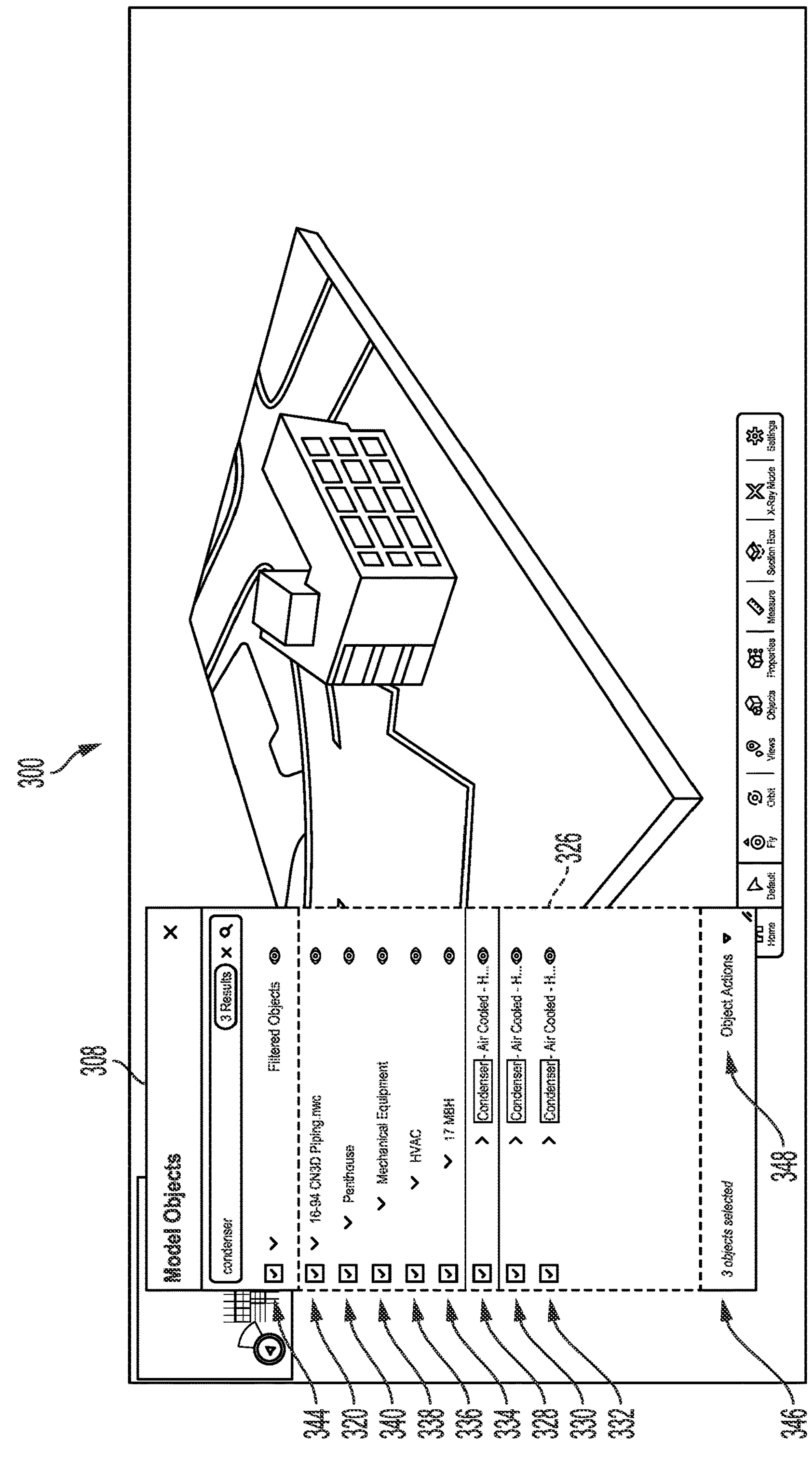
FIG. 3F illustrates another updated version of the example GUI view, according to the present disclosure.

FIGS. 3E and 3F are included to provide illustrative examples of how the client device 112 may update a visualization of a filtered list of BIM data objects based on a user's selection of one or more listed BIM data objects, as described with reference to block 224. As shown, FIG. 3E illustrates an updated version of the example GUI view 300 of the given BIM file, and further shows one possible example of how the visualization 326 may be updated in response to user input selecting one or more listed BIM data objects.

In the example illustrated in FIG. 3E, the user input received by the client device 112 comprises a user selection of the checkbox of the list item 332.

In response to receiving the user input selecting the checkbox of the line item 332, the client device 112 is shown to have updated the visualization 326 in various ways.

As one example, the client device 112 has updated the checkbox of the line item 332 to indicate a "checked" status. As another example, the client device 112 has updated the checkboxes for the other line items 334-340 and 320 that the line item 332 is nested beneath. These checkboxes have been updated to indicate a "partially checked" status, as only one of the three line items for a matching listed BIM data objects nested beneath the line items 334-340 and 320 have been selected. As yet another example, a "select all" selectable icon 344 is shown to indicate a "partially checked" status, indicating that some, but not all, of the matching listed BIM data objects included in the visualization 326 have been selected by the user. As yet still another example, the client device 112 has updated the visualization 326 to include a counter 346 indicating that one matching listed BIM data object has been selected by the user.

As yet another example, the client device 112 has updated the overlay 308 to include an "Object Actions" selectable button 348, which may enable the user to input a request for one or more actions to be taken on matching listed BIM data objects selected by the user, as described in greater detail below. The client device 112 may update the overlay 308 to include the "Object Actions" selectable button 348 at various times, and possibly in response to various triggers. As one possibility, the client device 112 may update the overlay 308 to include the "Object Actions" selectable button 348 when the user selects one or more of the matching listed BIM data objects. As another possibility, the client device 112 may update the overlay 308 to include the "Object Actions" selectable button 348 at the time the client device 112 updates the overlay 308 to include the visualization 326 of the filtered list of BIM data objects. Various other possibilities may also exist.

Turning now to FIG. 3F, an updated version of the example GUI view 300 of the BIM file is shown, and the visualization 326 has again been updated in response to receiving user input selecting one or more listed BIM data objects. For instance, the example of FIG. 3F shows how the visualization 326 may be updated in response to receiving a user selection of the checkbox of the line item 328, as well as a user selection of the checkbox of the line item 330.

Based on receiving these user selections, the client device 112 may update the checkboxes of the line items 328 and 330 to indicate a "checked" status. Further, the checkboxes of the line items 320 and 334-340 may also be updated to indicate the "checked" status, as every one of the matching listed BIM data objects nested beneath the line items 320 and 334-340 are now selected.

Similarly, because every matching listed BIM data object of the filtered list of BIM data objects is now selected, the "select all" selectable icon 344 has also been updated to indicate the "checked" status. Further, the counter 346 has been updated to indicate that three matching BIM data objects have been selected by the user. In practice, the client device 112 may update the presentation in various other ways as well.

Returning again to FIG. 2, at block 226, the user may input a request for one or more actions to be taken on the one or more listed BIM data objects selected at block 220. In practice, the user may input the request by interacting with a menu of actions, which may be presented to the user based on any of various user interactions with the filtered list of BIM data objects presented by the client device 112. As one example, the menu may be presented to the user based on a user interaction comprising a right mouse click or the like of a listed BIM data object (which may simultaneously serve as a selection of the listed BIM data object if it was not selected previously). As another example, the menu may be presented to the user based on a user interaction comprising a selection of an "object actions" selectable button that may be presented by the client device 112 as part of the visualization of the filtered list of BIM data objects, such as the "Object Actions" selectable button 348 of FIG. 3F.

Once the user has accessed the menu, the user may then select a selectable icon for a given action to be taken for the one or more selected listed BIM data objects. In practice, the selectable icon may be one of a number of selectable icons for actions that may be taken, which may be part of a pick list or the like presented upon the user accessing the menu. One selectable icon that the user may select may be a "select all" selectable icon, which may cause the client device 112 to select all of the matching BIM data objects of the filtered list of BIM data objects.

Another selectable icon that the user may select may be a "hide" selectable icon, which may cause the client device 112 to hide a respective visual representation for each of the one or more selected listed BIM data objects from the 3D visualization 302 (as well as possibly the 2D visualization 304).

Another selectable icon that the user may select may be a "hide similar" selectable icon, which may cause the client device 112 to, which may enable the user to hide a respective visual representation for each of the one or more selected listed BIM data objects, as well as other listed BIM data objects that are similar to the one or more selected BIM data objects (e.g., other listed BIM data objects with a similar name) from the 3D visualization 302 (as well as possibly the 2D visualization 304).

Another selectable icon that the user may select may be a "select similar" selectable icon, which may cause the client device 112 to select listed BIM data objects that are similar to the one or more selected listed BIM data objects (e.g., listed BIM data objects that have a similar name as the one or more selected listed BIM data objects).

Another selectable icon that the user may select may be an "isolate" selectable icon, which may cause the client device 112 to remove features of the 3D visualization 302 (and possibly the 2D visualization 304) except for respective visual representations of the one or more selected listed BIM data objects.

Another selectable icon that the user may select may be an "isolate similar" selectable icon, which may cause the client device 112 to remove features of the 3D visualization 302 (and possibly the 2D visualization 304) except for respective visual representations of the one or more selected listed BIM data objects and visual representations of one or more other listed BIM data objects that may be similar to the one or more selected listed BIM data objects.

Another selectable icon that the user may select may be an "isolate in X-ray" selectable icon, which may cause the client device 112 to show features of the 3D visualization 302 (and possibly the 2D visualization 304) in an X-ray format, except for respective visual representations of the one or more selected listed BIM data objects.

Another selectable icon that the user may select may be a "isolate in section box" selectable icon, which may cause the client device 112 to remove features of the 3D visualization 302 (and possibly the 2D visualization 304) except for a section box of the 3D visualization 302 (And possibly the 2D visualization 304) surrounding the visual representation (s) of the one or more selected listed BIM data objects.

Another selectable icon that the user may select may be a "view properties" selectable icon, which may cause the client device 112 to present a visualization that includes information for one or more properties of the one or more selected listed BIM data objects, which the client device 112 may obtain itself, for instance, if the information for the one or more properties are stored locally on the client device 112, or possibly from the back-end computing platform 102. For instance, the client device 112 may transmit a request to the back-end computing platform 102 for the information for the one or more properties of the one or more selected listed BIM data objects. In turn, the back-end computing platform 102 may (i) receive the request from the client device 112, (ii) retrieve the information for the one or more properties of the one or more selected listed BIM data objects (e.g., from storage of the back-end computing platform 102 or external storage accessible to the back-end computing platform 102), and then (iii) return the information for the one or more properties of the one or more selected listed BIM data objects to the client device 112.

Another selectable icon that the user may select may be a "zoom to selection" selectable icon, which may cause the client device 112 to adjust a viewpoint of the 3D visualization 302 (and possibly the 2D visualization 304) to zoom to the visual representation(s) of the one or more selected listed BIM data objects. Various other possibilities may also exist.

Figure 3G:
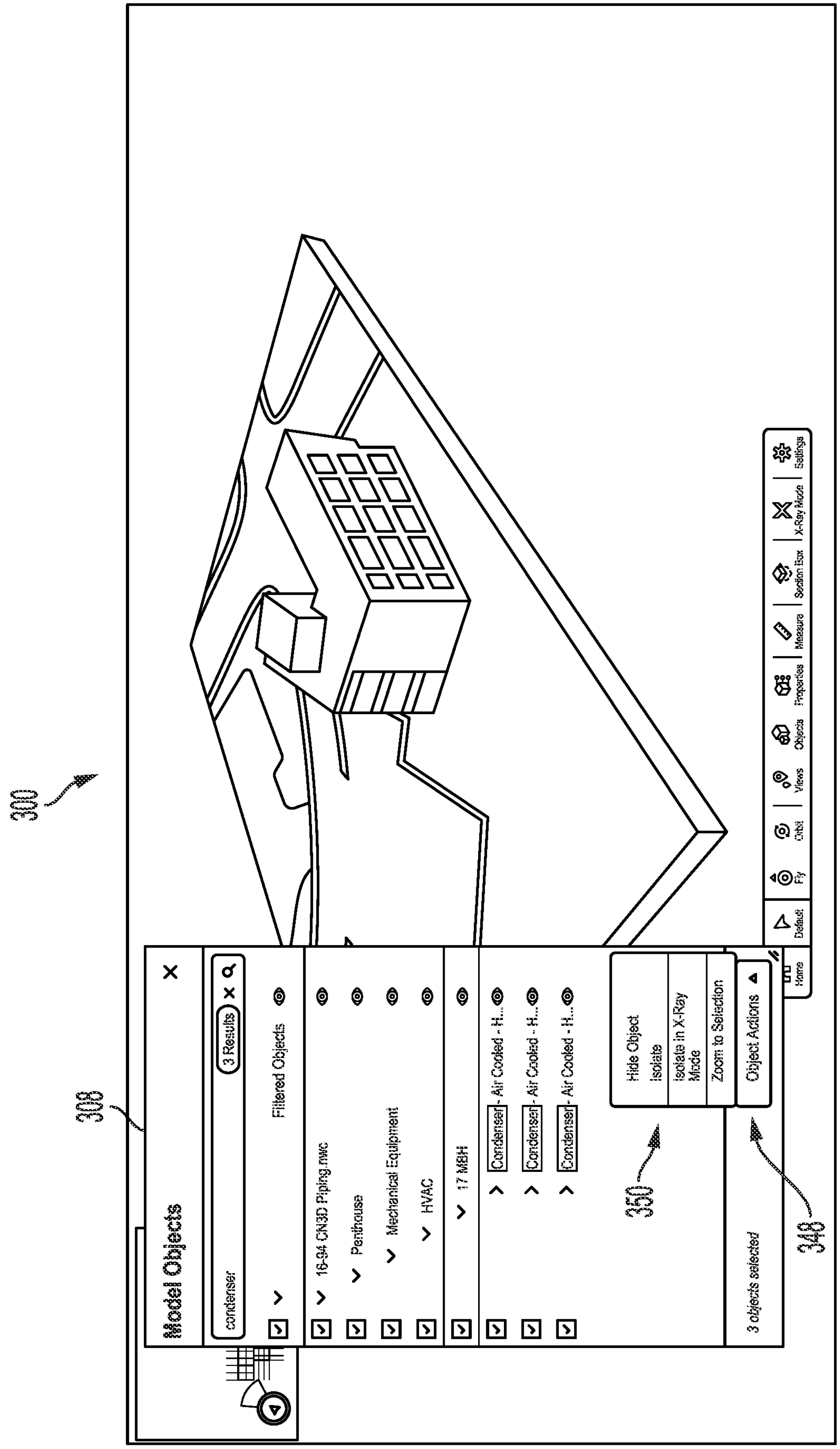
FIG. 3G illustrates another updated version of the example GUI view, according to the present disclosure.

FIG. 3G illustrates an example manner in which the client device 112 may enable the user to input the one or more actions to be taken for the one or more selected listed BIM data objects. As shown in FIG. 3G, the "Object Actions" selectable button 348 may, upon being selected by the user, cause a menu 350 to be presented including a pick list of selectable icons for available actions. As shown, the menu 350 includes a pick list of selectable icons for a "Hide Object" action, an "Isolate" action, an "Isolate in X-Ray Mode" action, and a "Zoom to Selection" action. The selectable icons shown in the menu 350 are intended to be illustrative only, and in practice the menu 350 may include selectable icons for any of various other actions, such as those previously described.

In line with the previous discussion, the view/hide selectable elements may also be selectable by the user to cause one or more actions to be taken for selected listed BIM data objects. In practice, selection of a view/hide selectable icon may cause a visual representation of a corresponding listed BIM data object to be shown or hidden from view in a visualization of the 3D visualization 302 (and possibly the 2D visualization 304).

Returning to FIG. 2, at block 228, the client device 112 may receive the user's request for one or more actions to be taken on the selected one or more listed BIM data objects.

At block 230, the client device 112 may then cause one or more actions to be taken for the selected one or more listed BIM data objects (e.g., the one or more actions requested by the user). In practice, the client device 112 may cause one or more actions to be taken in various ways.

As one possibility, the client device 112 may cause the one or more actions to be taken by virtue of triggering some other aspect of the software application running on the client device 112 to take the one or more actions locally.

As another possibility, the client device 112 may cause the one or more actions to be taken by virtue of requesting and thereby causing the back-end computing platform 102 to perform the one or more actions remotely. For example, the client device 112 may transmit a request to the back-end computing platform 102 including (i) an indication of the one or more listed BIM data objects selected by the user and (ii) an indication of the one or more actions to be taken for the one or more selected listed BIM data objects. The back-end computing platform 102 may receive the request and then perform operations of optional block 230' by performing the one or more actions indicated in the request.

As yet another possibility, the client device 112 may cause the one or more actions to be taken by virtue of triggering some other aspect of the software application running on the client device 112 to perform some functionality for accomplishing the one or more actions and also requesting and thereby causing the back-end computing platform 102 to perform other functionality for accomplishing the one or more actions. For example, the client device 112 may be configured to cause the back-end computing platform 102 to perform one or more initial operations for the one or more actions requested by the user. Then, the back-end computing platform 102 may return the results of the initial operations to the client device 112, at which point the client device 112 may, based on the results of the initial operations, perform one or more additional operations to perform the one or more actions requested by the user. Various other possibilities may also exist.

Whether the client device 112 performs the one or more actions locally, causes the back-end computing platform 102 to perform the one or more actions, or works with the back-end computing platform 102 to perform the one or more actions may depend on the nature of the one or more actions. For instance, the client device 112 may be configured to perform actions such as "hide object," "isolate," "isolate in x-ray mode," "isolate in section box," and "zoom to selection," whereas the back-end computing platform 102 may be configured to perform actions comprising "hide similar," "select similar," and "view properties." Accordingly, the client device 112 may be configured to determine whether to perform the one or more actions locally, to cause the back-end computing platform 102 to perform the one or more actions, or some combination thereof based at least in part on an analysis of the types of actions that are included in the user request received at block 228.

Figure 4:
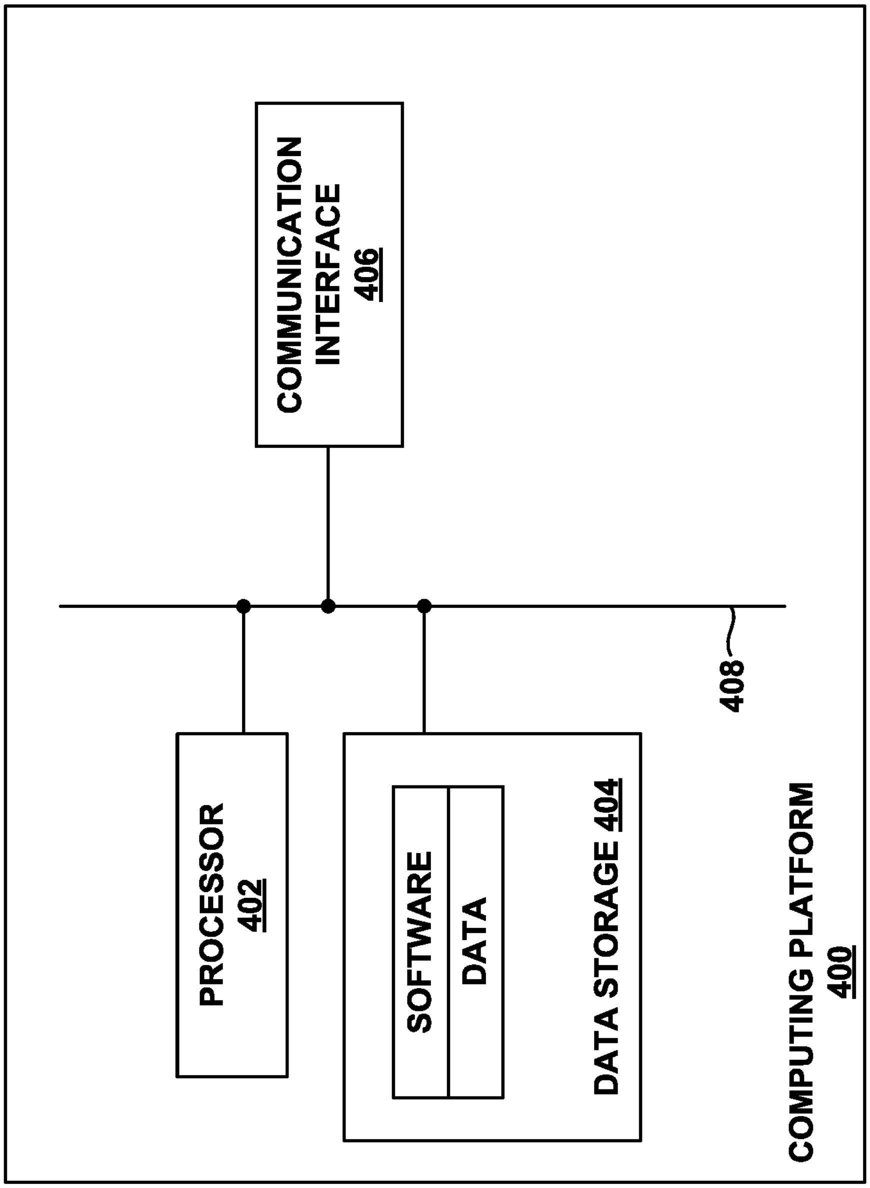
FIG. 4 is a simplified block diagram that illustrates some structural components that may be included in an example back-end computing platform, according to the present disclosure.

Turning now to FIG. 4, a simplified block diagram is provided to illustrate some structural components that may be included in an example computing platform 400 that may be configured to perform some or all of the server-side functions disclosed herein. At a high level, the example computing platform 400 may generally comprise any one or more computer systems (e.g., one or more servers) that collectively include one or more processors 402, data storage 404, and one or more communication interfaces 406, all of which may be communicatively linked by a communication link 408 that may take the form of a system bus, a communication network such as a public, private, or hybrid cloud, or some other connection mechanism. Each of these components may take various forms.

For instance, the one or more processors 402 may comprise one or more processor components, such as one or more central processing units (CPUs), graphics processing unit (GPUs), application-specific integrated circuits (ASICs), digital signal processor (DSPs), and/or programmable logic devices such as field programmable gate arrays (FPGAs), among other possible types of processing components. In line with the discussion above, it should also be understood that the one or more processors 402 could comprise processing components that are distributed across a plurality of physical computing devices connected via a network, such as a computing cluster of a public, private, or hybrid cloud.

In turn, the data storage 404 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 404 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 4, the data storage 404 may be capable of storing both (i) program instructions that are executable by the one or more processors 402 such that the example computing platform 400 is configured to perform any of the various functions disclosed herein (including but not limited to any of the server-side functions discussed above), and (ii) data that may be received, derived, or otherwise stored by the example computing platform 400.

The one or more communication interfaces 406 may comprise one or more interfaces that facilitate communication between the example computing platform 400 and other systems or devices, where each such interface may be wired and/or wireless and may communicate according to any of various communication protocols. As examples, the one or more communication interfaces 406 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the example computing platform 400 may additionally have an I/O interface that includes or provides connectivity to I/O components that facilitate user interaction with the example computing platform 400, such as a keyboard, a mouse, a trackpad, a display screen, a touch-sensitive interface, a stylus, a virtual-reality headset, and/or one or more speaker components, among other possibilities.

It should be understood that the example computing platform 400 is one example of a computing platform that may be used with the embodiments described herein. Numerous other arrangements are possible and contemplated herein. For instance, in other embodiments, the example computing platform 400 may include additional components not pictured and/or more or less of the pictured components.

Figure 5:
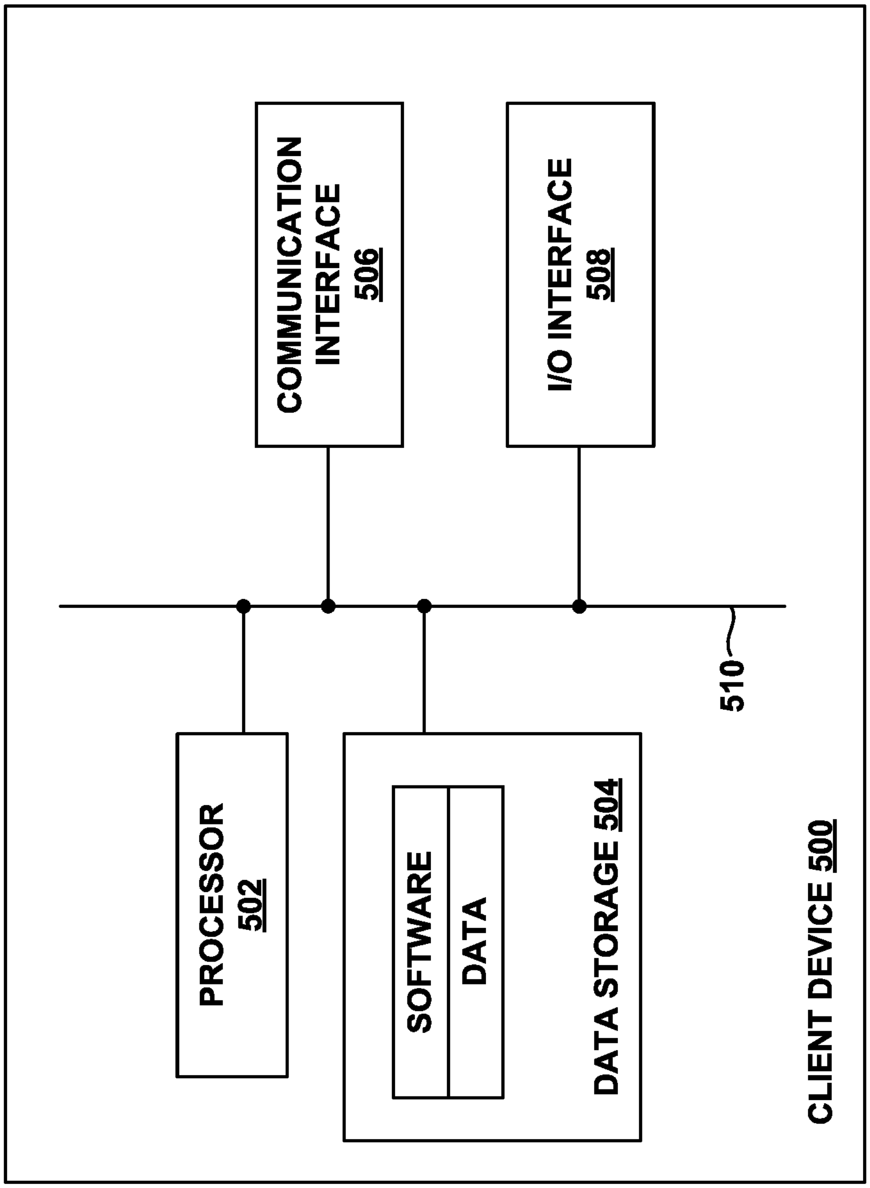
FIG. 5 is a simplified block diagram that illustrates some structural components that may be included in an example client device, according to the present disclosure.

Turning next to FIG. 5, a simplified block diagram is provided to illustrate some structural components that may be included in an example client device 500 that may be configured to perform some or all of the client-side functions disclosed herein. At a high level, the example client device 500 may include one or more processors 502, data storage 504, one or more communication interfaces 506, and an I/O interface 508, all of which may be communicatively linked by a communication link 510 that may take the form a system bus and/or some other connection mechanism. Each of these components may take various forms.

For instance, the one or more processors 502 of the example client device 500 may comprise one or more processor components, such as one or more CPUs, GPUs, ASICs, DSPs, and/or programmable logic devices such as FPGAs, among other possible types of processing components.

In turn, the data storage 504 of the example client device 500 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 5, the data storage 504 may be capable of storing both (i) program instructions that are executable by the one or more processors 502 of the example client device 500 such that the example client device 500 is configured to perform any of the various functions disclosed herein (including but not limited to any of the client-side functions discussed above), and (ii) data that may be received, derived, or otherwise stored by the example client device 500.

The one or more communication interfaces 506 may comprise one or more interfaces that facilitate communication between the example client device 500 and other systems or devices, where each such interface may be wired and/or wireless and may communicate according to any of various communication protocols. As examples, the one or more communication interfaces 506 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 508 may generally take the form of (i) one or more input interfaces that are configured to receive and/or capture information at the example client device 500 and (ii) one or more output interfaces that are configured to output information from the example client device 500 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of the I/O interface 508 may include or provide connectivity to output components such as a display screen and/or an audio speaker, among other possibilities.

It should be understood that the example client device 500 is one example of a client device that may be used with the example embodiments described herein. Numerous other arrangements are possible and contemplated herein. For instance, in other embodiments, the example client device 500 may include additional components not pictured and/or more or fewer of the pictured components.

CONCLUSION

Example embodiments of the disclosed innovations have been described above. Those skilled in the art will understand, however, that changes and modifications may be made to the embodiments described without departing from the true scope and spirit of the present invention, which will be defined by the claims.

For instance, those in the art will understand that the disclosed software technology may be implemented in areas other than construction and construction-related projects and may be used in other ways as well.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A client device comprising:

at least one processor;

at least one non-transitory computer-readable medium; and program instructions stored on the at least one non-transitory computer-readable medium that are executable by the at least one processor such that the client device is configured to:

access a building information model (BIM) file that encodes a three-dimensional (3D) model for a construction project;

obtain an initial list of BIM data objects included in the BIM file;

present, to a user, a graphical user interface (GUI) view that comprises a visualization of (i) the 3D model and (ii) the initial list of BIM data objects that is overlaid on top of the 3D model;

receive a search query for the initial list of BIM data objects, wherein the search query comprises one or more search terms entered by the user in a text-entry field of the GUI view;

after receiving the search query, present, to the user, a first updated GUI view that comprises a visualization of (i) the 3D model and (ii) a filtered list of BIM data objects that is overlaid on top of the 3D model, wherein the visualization of the filtered list of BIM data objects comprises (i) a given subset of BIM data objects that match the one or more search terms, and (ii) any other BIM data object that does not match the one or more search terms but has a hierarchical relationship with a respective BIM data object in the given subset;

receive, from the user, a request for an action to isolate at least one BIM data object that is selected from the filtered list of BIM data objects; and based on the received request, cause the requested action to isolate the at least one BIM data object by presenting a second updated GUI view that comprises an updated visualization of the 3D model that includes the at least one BIM data object without including visualizations of other BIM data objects.

2. The client device of claim 1, further comprising program instructions stored on the at least one non-transitory computer-readable medium that are executable by the at least one processor such that the client device is configured to:

receive, from the user, an input indicating a selection of the at least one BIM data object; and based on the input indicating the selection of the at least one BIM data object, determine that one or more additional BIM data objects are selected from the filtered list of BIM data objects.

3. The client device of claim 1, wherein the program instructions that are executable by the at least one processor such that the client device is configured to obtain the initial list of BIM data objects comprise program instructions that are executable by the at least one processor such that the client device is configured to generate the initial list of BIM data objects locally.

4. The client device of claim 1, wherein the program instructions that are executable by the at least one processor such that the client device is configured to obtain the initial list of BIM data objects comprise program instructions that are executable by the at least one processor such that the client device is configured to:

transmit a request to a back-end computing platform for the initial list of BIM data objects; and receive the initial list of BIM data objects from the back-end computing platform.

5. The client device of claim 1, further comprising program instructions stored on the at least one non-transitory computer-readable medium that are executable by the at least one processor such that the client device is configured to perform a search against a dataset stored in a data storage of the client device to thereby identify the given subset of BIM data objects based on the one or more search terms.

6. The client device of claim 5, wherein the dataset comprises, for each BIM data object in the initial list, data representing one or more of a respective type, category, name, or cost associated with the BIM data object.

7. The client device of claim 1, further comprising program instructions stored on the at least one non-transitory computer-readable medium that are executable by the at least one processor such that the client device is configured to:

transmit a request to a back-end computing platform to perform a search against a dataset stored in a data storage accessible to the back-end computing platform to thereby identify the given subset of BIM data objects based on the one or more search terms; and receive the given subset of BIM data objects from the back-end computing platform.

8. The client device of claim 1, wherein the given subset of BIM data objects that match the one or more search terms comprises, for each BIM data object in the given subset, an alphanumeric label that partially or fully matches the one or more search terms of the search query.

9. The client device of claim 8, wherein the any other BIM data object that does not match the one or more search terms of the search query but has a hierarchical relationship with the respective BIM data object in the given subset comprises at least one BIM data object that (i) has an alphanumeric label that does not partially or fully match the one or more search terms of the search query but (ii) has a hierarchical relationship with the respective BIM data object in the given subset.

10. The client device of claim 1, wherein the hierarchical relationship comprises an ancestor relationship or a descendent relationship.

11. The client device of claim 1, wherein the GUI view further comprises a visualization of a two-dimensional (2D) model for the construction project that is overlaid on top of the 3D model.

12. A non-transitory computer-readable medium, wherein the non-transitory computer-readable medium is provisioned with program instructions that, when executed by at least one processor, cause a client device to:

access a building information model (BIM) file that encodes a three-dimensional (3D) model for a construction project;

obtain an initial list of BIM data objects included in the BIM file;

present, to a user, a graphical user interface (GUI) view that comprises a visualization of (i) the 3D model and (ii) the initial list of BIM data objects that is overlaid on top of the 3D model;

receive a search query for the initial list of BIM data objects, wherein the search query comprises one or more search terms entered by the user in a text-entry field of the GUI view;

after receiving the search query, present, to the user, a first updated GUI view that comprises a visualization of (i)

the 3D model and (ii) a filtered list of BIM data objects that is overlaid on top of the 3D model, wherein the visualization of the filtered list of BIM data objects comprises (i) a given subset of BIM data objects that match the one or more search terms, and (ii) any other BIM data object that does not match the one or more search terms but has a hierarchical relationship with a respective BIM data object in the given subset;

receive, from the user, a request for an action to isolate at least one BIM data object that is selected from the filtered list of BIM data objects; and based on the received request, cause the requested action to isolate the at least one BIM data object by presenting a second updated GUI view that comprises an updated visualization of the 3D model that includes the at least one BIM data object without including visualizations of other BIM data objects.

13. The non-transitory computer-readable medium of claim 12, wherein the non-transitory computer-readable medium is also provisioned with program instructions that, when executed by the at least one processor, cause the client device to:

receive, from the user, an input indicating a selection of the at least one BIM data object; and based on the input indicating the selection of the at least one BIM data object, determine that one or more additional BIM data objects are selected from the filtered list of BIM data objects.

14. The non-transitory computer-readable medium of claim 12, wherein the program instructions that, when executed by the at least one processor, cause the client device to obtain the initial list of BIM data objects comprise program instructions that, when executed by the at least one processor, cause the client device to generate the initial list of BIM data objects locally.

15. The non-transitory computer-readable medium of claim 12, wherein the program instructions that, when executed by the at least one processor, cause the client device to obtain the initial list of BIM data objects comprise program instructions that, when executed by the at least one processor, cause the client device to:

transmit a request to a back-end computing platform for the initial list of BIM data objects; and receive the initial list of BIM data objects from the back-end computing platform.

16. The non-transitory computer-readable medium of claim 12, wherein the non-transitory computer-readable medium is also provisioned with program instructions that, when executed by the at least one processor, cause the client device to:

perform a search against a dataset stored in a data storage of the client device to thereby identify the given subset of BIM data objects based on the one or more search terms.

17. The non-transitory computer-readable medium of claim 12, wherein the non-transitory computer-readable medium is also provisioned with program instructions that, when executed by the at least one processor, cause the client device to:

transmit a request to a back-end computing platform to perform a search against a dataset stored in a data storage accessible to the back-end computing platform to thereby identify the given subset of BIM data objects based on the one or more search terms; and receive the given subset of BIM data objects from the back-end computing platform.

18. The non-transitory computer-readable medium of claim 12, wherein the given subset of BIM data objects that match the one or more search terms comprises, for each BIM data object in the given subset, an alphanumeric label that partially or fully matches the one or more search terms of the search query.

19. The non-transitory computer-readable medium of claim 18, wherein the any other BIM data object that does not match the one or more search terms of the search query but has a hierarchical relationship with the respective BIM data object in the given subset comprises at least one BIM data object that (i) has an alphanumeric label that does not partially or fully match the one or more search terms of the search query but (ii) has a hierarchical relationship with the respective BIM data object in the given subset.

20. A method implemented by a client device, the method comprising:

accessing a building information model (BIM) file that encodes a three-dimensional (3D) model for a construction project;

obtaining an initial list of BIM data objects included in the BIM file;

presenting, to a user, a graphical user interface (GUI) view that comprises a visualization of (i) the 3D model and (ii) the initial list of BIM data objects that is overlaid on top of the 3D model;

receiving a search query for the initial list of BIM data objects, wherein the search query comprises one or more search terms entered by the user in a text-entry field of the GUI view;

after receiving the search query, presenting, to the user, a first updated GUI view that comprises a visualization of (i) the 3D model and (ii) a filtered list of BIM data objects that is overlaid on top of the 3D model, wherein the visualization of the filtered list of BIM data objects comprises (i) a given subset of BIM data objects that match the one or more search terms, and (ii) any other BIM data object that does not match the one or more search terms but has a hierarchical relationship with a respective BIM data object in the given subset;

receiving, from the user, a request for an action to isolate at least one BIM data object that is selected from the filtered list of BIM data objects; and based on the received request, causing the requested action to isolate the at least one BIM data object by presenting a second updated GUI view that comprises an updated visualization of the 3D model that includes the at least one BIM data object without including visualizations of other BIM data objects.

* * * * *